(12) United States Patent
Song et al.

(10) Patent No.: US 12,411,655 B2
(45) Date of Patent: Sep. 9, 2025

(54) DEVICE AND METHOD FOR TRANSMITTING VOICE DATA OF USER IN VIRTUAL SPACE

(71) Applicant: Samsung Electronics Co., Ltd., Suwon-si (KR)

(72) Inventors: Gajin Song, Suwon-si (KR); Hoseon Shin, Suwon-si (KR); Dongchoon Hwang, Suwon-si (KR); Kyungtae Kim, Suwon-si (KR); Kanghee Lee, Suwon-si (KR); Woojung Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/403,083

(22) Filed: Jan. 3, 2024

(65) Prior Publication Data

US 2024/0160402 A1    May 16, 2024

Related U.S. Application Data

(63) Continuation of application No. PCT/KR2023/012061, filed on Aug. 14, 2023.

(30) Foreign Application Priority Data

Sep. 8, 2022   (KR) .................. 10-2022-0114520
Oct. 27, 2022  (KR) .................. 10-2022-0140344

(51) Int. Cl.
*G06F 3/16* (2006.01)
*G06F 3/01* (2006.01)

(52) U.S. Cl.
CPC .............. *G06F 3/167* (2013.01); *G06F 3/017* (2013.01)

(58) Field of Classification Search
None
See application file for complete search history.

(56) References Cited

U.S. PATENT DOCUMENTS 10,176,808 B1   1/2019   Lovitt et al.
11,205,293 B2  12/2021   Kojima et al.
(Continued)

FOREIGN PATENT DOCUMENTS

JP   2018174439 A    11/2018
JP   2021184189 A  * 12/2021
(Continued)

OTHER PUBLICATIONS

How to use Live Automatic Transcripts/Captions in Zoom, Apr. 2021, https://www.wichita.edu/services/mrc/OIR/Zoom/LiveTranscripts.php (Year: 2021).*

(Continued)

*Primary Examiner* — Kirk W Hermann
(74) *Attorney, Agent, or Firm* — Nixon & Vanderhye, P.C.

(57) ABSTRACT

An example server for constructing a virtual space includes a memory configured to store computer-executable instructions and a processor configured to execute the instructions by accessing the memory. The instructions, when executed, cause the processor to extract first partial voice data corresponding to a target utterance from voice data of a first user received from a terminal of the first user among users in the virtual space; instruct a target terminal of the target user to reproduce the first partial voice data; and, based on transmission of second partial voice data of a second user to the target user being requested while the target terminal reproduces the first partial voice data, instruct the target terminal to display visual information generated based on the second partial voice data.

20 Claims, 12 Drawing Sheets

(56) References Cited

U.S. PATENT DOCUMENTS

| | | | |
|---|---|---|---|
| 2006/0164508 A1* | 7/2006 | Eshkoli | H04N 7/152 |
| | | | 348/14.09 |
| 2014/0267550 A1* | 9/2014 | Nimri | H04N 7/152 |
| | | | 348/14.09 |
| 2018/0032304 A1 | 2/2018 | Lin | |
| 2018/0366118 A1 | 12/2018 | Lovitt et al. | |
| 2020/0258525 A1* | 8/2020 | McQuiston | G06Q 10/109 |
| 2021/0248803 A1 | 8/2021 | Kojima et al. | |
| 2023/0208663 A1* | 6/2023 | Jovanovic | H04N 7/147 |
| | | | 709/204 |

FOREIGN PATENT DOCUMENTS

| | | |
|---|---|---|
| JP | 2022092784 A | 6/2022 |
| KR | 20130032966 A | 4/2013 |
| KR | 20130084856 A | 7/2013 |
| KR | 20160017130 A | 2/2016 |
| KR | 101818024 B1 | 1/2018 |
| KR | 20180044077 A | 5/2018 |
| KR | 20190095181 A | 8/2019 |
| KR | 102277438 B1 | 7/2021 |
| KR | 20220046773 A | 4/2022 |
| WO | 2022107197 A1 | 5/2022 |
| WO | 2022182744 A1 | 9/2022 |

OTHER PUBLICATIONS

Extended Search Report dated Jul. 8, 2025 in EP Application No. 23863372.1.

* cited by examiner

DEVICE AND METHOD FOR TRANSMITTING VOICE DATA OF USER IN VIRTUAL SPACE

CROSS-REFERENCE TO RELATED APPLICATIONS

This application is a continuation application of International Application No. PCT/KR2023/012061 designating the United States, filed on Aug. 14, 2023, in the Korean Intellectual Property Receiving Office and claiming priority to Korean Patent Application No. 10-2022-0114520, filed on Sep. 8, 2022 and Korean Patent Application No. 10-2022-0140344, filed on Oct. 27, 2022, in the Korean Intellectual Property Office, the disclosures of each of which are incorporated by reference herein in their entireties.

BACKGROUND

1. Field

The disclosure relates to a technology for transmitting voice data of a user in a virtual space.

2. Description of Related Art

Recently, virtual reality (VR), augmented reality (AR), and mixed reality (MR) technologies utilizing computer graphics technology have been developed. The VR technology may, for example, construct a virtual space that does not exist in a real world using a computer and provide users with the virtual space to allow them to feel it as real. AR or MR technology may, for example, add information generated by a computer into the real world to express it, that is, combine the real world and the virtual world to allow users to interact therein in real time.

Among these, AR and MR technologies are used in conjunction with technologies in various fields, for example, broadcasting, medical field, game, and the like. Representative examples of such applications of AR technology may include, for example, a case in which a weather map in front of a weather forecaster who gives a weather forecast on a television (TV) changes naturally or a case in which an advertisement image that is not actually present in a sports stadium is inserted in and transmitted onto the screen as if it is actually present in the stadium during sports broadcasting.

A metaverse is, for example, a representative service that provides AR and MR. The metaverse, a compound of "meta" which means processing and abstraction and "universe" which means the real world, may refer to a three-dimensional (3D) virtual world. The metaverse, a concept that is more advanced than the term indicating an existing VR environment, may provide an AR environment in which a virtual world on the web or the internet is absorbed into the real world.

SUMMARY

According to example embodiments, a server constructing a virtual space includes a memory configured to store computer-executable instructions and a processor configured to execute the instructions by accessing the memory. The instructions, when executed, cause the processor to extract first partial voice data corresponding to a target utterance from voice data of a first user received from a terminal of the first user among users in the virtual space; determine a target user to receive the first partial voice data of the first user; instruct a target terminal of the target user to reproduce the first partial voice data; and, based on transmission of second partial voice data of a second user to the target user being requested while the target terminal reproduces the first partial voice data, instruct the target terminal to display visual information generated based on the second partial voice data.

According to example embodiments, a method performed by a server constructing a virtual space includes extracting first partial voice data corresponding to a target utterance from voice data of a first user received from a terminal of the first user among users in the virtual space; determining a target user to receive the first partial voice data of the first user; instructing a target terminal of the target user to reproduce the first partial voice data; and, based on transmission of second partial voice data of a second user to the target user being requested while the target terminal reproduces the first partial voice data, instructing the target terminal to display visual information generated based on the second partial voice data.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
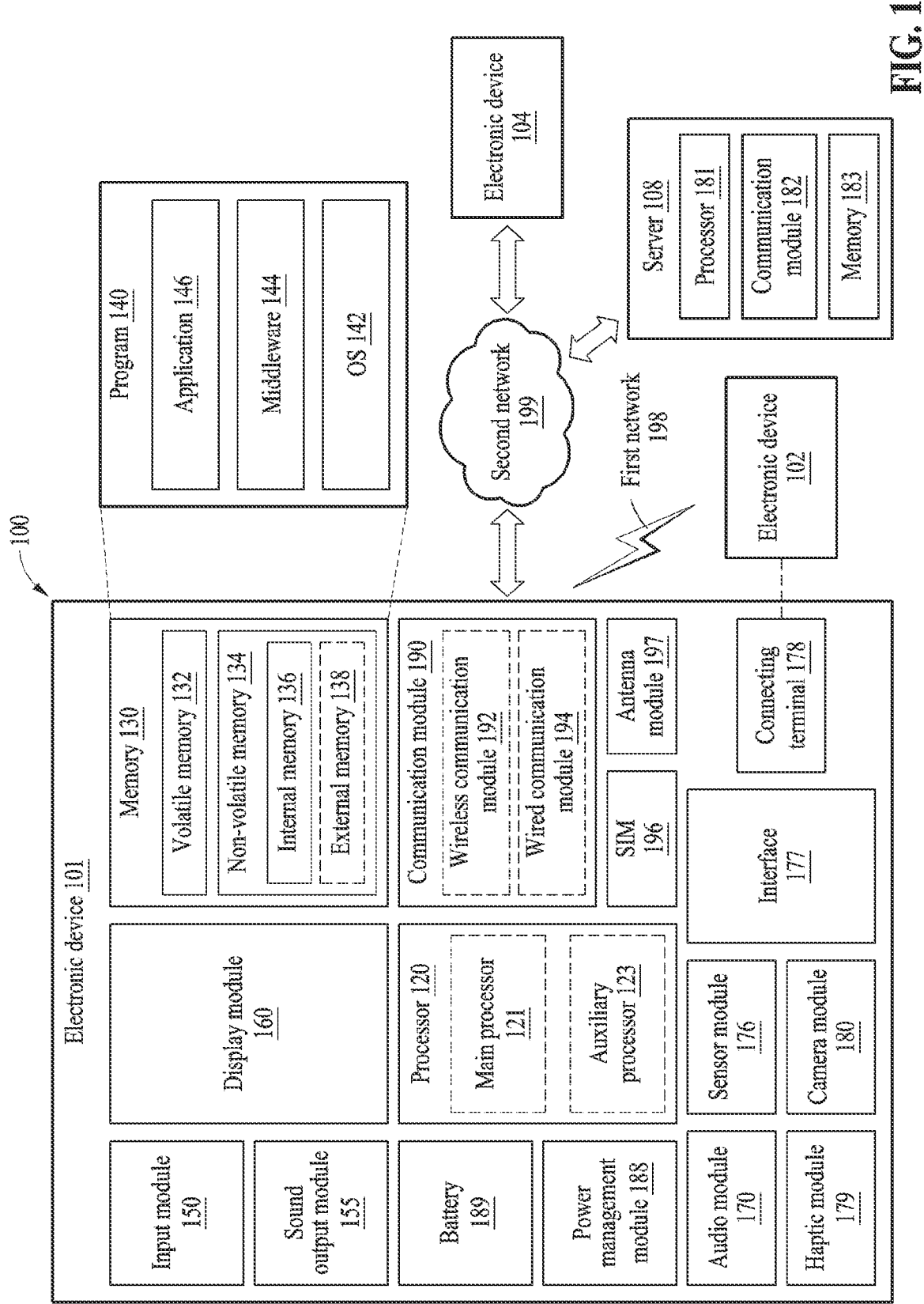
FIG. 1 is a block diagram illustrating an example configuration of an electronic device according to various embodiments.

Hereinafter, embodiments will be described in detail with reference to the accompanying drawings. When describing the embodiments with reference to the accompanying drawings, like reference numerals refer to like elements and a description related thereto will not be repeated.

FIG. 1 is a block diagram illustrating an example configuration of an electronic device according to various embodiments.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated by machine learning. Such learning may be performed, for example, by the electronic device 101 in which an artificial intelligence model is executed, or via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a portion of the speaker.

The display module 160 (e.g., a display) may visually provide information to the outside (e.g., a user) of the electronic device 101. The display module 160 may include, for example, a display, a hologram device, or a projector and control circuitry to control a corresponding one of the display, the hologram device, or the projector. According to an embodiment, the display module 160 may include a touch sensor adapted to detect a touch, or a pressure sensor adapted to measure the intensity of force incurred by the touch.

The audio module 170 may convert a sound into an electric signal or vice versa. According to an embodiment, the audio module 170 may obtain the sound via the input module 150, or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199.

Each of the external electronic devices 102 and 104, and the server 108 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least a portion of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. In the disclosure, an example will be described in which the electronic device 101 is an augmented reality (AR) device (e.g., an electronic device 201 of FIG. 2, an electronic device 301 of FIG. 3, or an electronic device 401 of FIGS. 4A and 4B), and the server 108 among the external electronic devices (e.g., 102, 104, and 108) transmits, to the electronic device 101, a result of executing a virtual space and an additional function or service associated with the virtual space.

The server 108 may include a processor 181, a communication module 182, and a memory 183. The processor 181, the communication module 182, and the memory 183 may be similarly configured to the processor 120, the communication module 190, and the memory 130 of the electronic device 101. For example, the processor 181 may provide a virtual space and an interaction between users in the virtual space by executing instructions stored in the memory 183. The processor 181 may generate at least one of visual information, auditory information, or tactile information of the virtual space and objects in the virtual space. For example, as the visual information, the processor 181 may generate rendering data (e.g., visual rendering data) obtained by rendering an appearance (e.g., a shape, size, color, or texture) of the virtual space and an appearance (e.g., a shape, size, color, or texture) of an object in the virtual space. In addition, the processor 181 may generate rendering data obtained by rendering interactions between objects (e.g., physical objects, virtual objects, or avatar objects) in the virtual space or a change (e.g., a change in an appearance of an object, generation of a sound, or a tactile input) based on at least one of user inputs to an object (e.g., a physical object, a virtual object, or an avatar object). The communication module 182 may establish communication with a first electronic device (e.g., the electronic device 101) of a user and a second electronic device (e.g., the electronic device 102) of another user. The communication module 182 may transmit at least one of the visual information, the auditory information, or the tactile information described above to the first electronic device and the second electronic device. For example, the communication module 182 may transmit the rendering data.

For example, the server 108 may render content data executed in an application and transmit the rendered content data to the electronic device 101, and the electronic device 101 receiving the data may output the content data to the display module 160. When the electronic device 101 detects a movement of a user through an inertial measurement unit (IMU) sensor or the like, the processor 120 of the electronic device 101 may correct the rendering data received from the server 108 based on the movement information and output the corrected movement information to the display module 160. Alternatively, the processor may transmit the movement information to the server 108 to request rendering such that screen data is updated accordingly. However, the example embodiments are not limited in this respect, and the rendering may be performed by various types of external electronic devices (e.g., 102 and 104) such as a smartphone or a case device for storing and charging the electronic device 101. The rendering data corresponding to the virtual space generated by the external electronic devices 102 and 104 may be provided to the electronic device 101. In an example, the electronic device 101 may receive virtual spatial information (e.g., vertex coordinates, texture, and color defining a virtual space) and object information (e.g., vertex coordinates, texture, and color defining an appearance of an object) from the server 108 and perform rendering by itself based on the received data.

Figure 2:
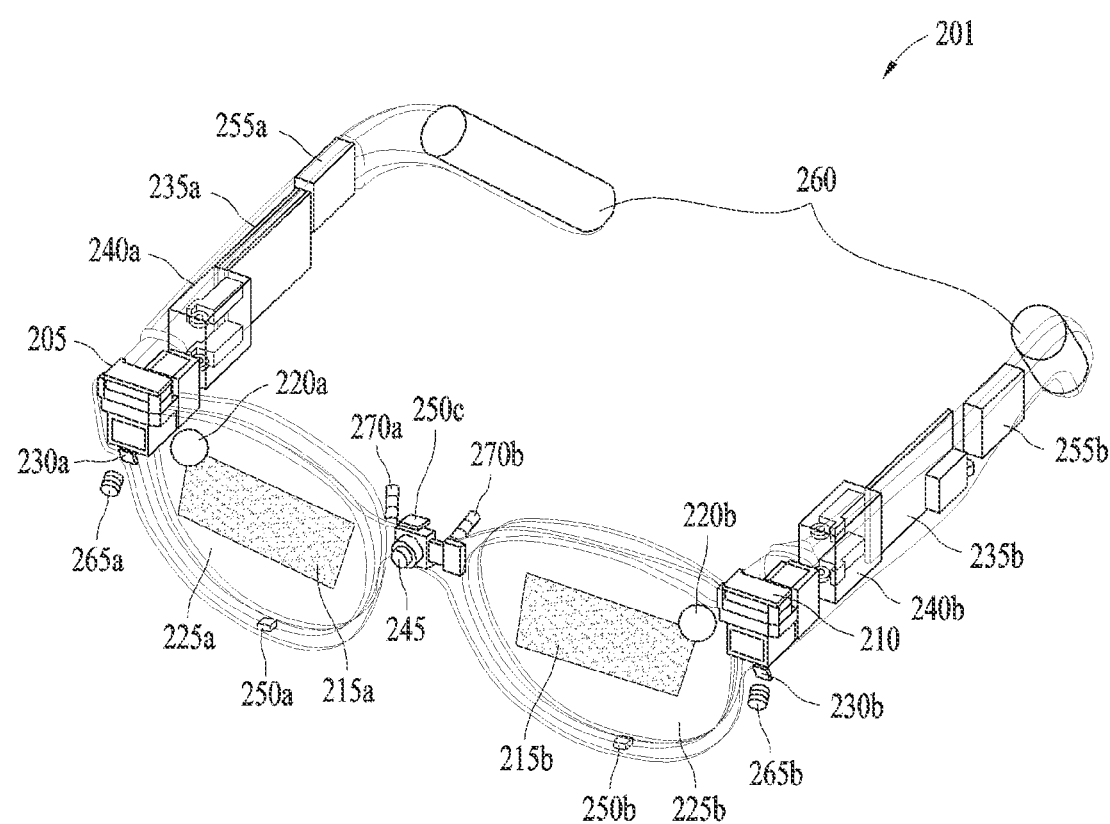
FIG. 2 is a diagram illustrating an example optical see-through (OST) device according to various embodiments.

FIG. 2 is a diagram illustrating an example optical see-through (OST) device according to various embodiments.

An electronic device 201 may include at least one of a display (e.g., the display module 160 of FIG. 1), a vision sensor, light sources 230a and 230b, an optical element, or a substrate. The electronic device 201 including a transparent display and providing an image through the transparent display may be referred to, for example, as an OST device.

The display may include, for example, a liquid crystal display (LCD), a digital mirror device (DMD), a liquid crystal on silicon (LCoS), an organic light-emitting diode (OLED), or a micro light-emitting diode (micro-LED). Although not shown, when the display is one of an LCD, a DMD, and an LCoS, the electronic device 201 may include the light sources 230a and 230b configured to emit light to a screen output area (e.g., screen display portions 215a and 215b) of the display. In an embodiment, when the display is capable of generating light by itself, for example, when the display is either an OLED or a micro-LED, the electronic device 201 may provide a virtual image with relatively high quality to a user even though the separate light source 230a or 230b is not included. For example, when the display is implemented as an OLED or a micro-LED, the light sources 230a and 230b may be unnecessary, and thus the electronic device 201 may be reduced in weight.

Referring to FIG. 2, the electronic device 201 may include the display, a first transparent member 225a, and/or a second transparent member 225b, and the user may use the electronic device 201 while wearing the electronic device 201 on a face of the user. The first transparent member 225a and/or the second transparent member 225b may be formed of a glass plate, a plastic plate, or a polymer, and may be transparently or translucently formed. According to an embodiment, the first transparent member 225a may be disposed to face the right eye of the user, and the second transparent member 225b may be disposed to face the left eye of the user. The display may include a first display 205 configured to output a first image (e.g., a right image) corresponding to the first transparent member 225a, and a second display 210 configured to output a second image (e.g., a left image) corresponding to the second transparent member 225b. According to an embodiment, when each display is transparent, the displays and the transparent members may be disposed to face the eyes of the user to configure the screen display portions 215a and 215b.

In an embodiment, a light path of light emitted from the displays 205 and 210 may be guided by a waveguide through the input optical members 220a and 220b. Light inside the waveguide may be guided toward the eyes of the user through an output optical member (e.g., an output optical member 340 of FIG. 3). The screen display portions 215a and 215b may be determined based on the light emitted toward the eyes of the user.

For example, the light emitted from the displays 205 and 210 may be reflected from a grating area of the waveguide formed in the input optical members 220a and 220b and the screen display portions 215a and 215b, and may be transmitted to the eyes of the user.

The optical element may include at least one of a lens or an optical waveguide.

The lens may adjust a focus such that a screen output to the display may be visible to the eyes of the user. The lens may include, for example, at least one of a Fresnel lens, a pancake lens, or a multi-channel lens.

The optical waveguide may transfer image rays generated from the display to the eyes of the user. For example, an image ray may, for example, refer to a ray of light that has passed through the screen output area of the display after being emitted by the light sources 230a and 230b. The optical waveguide may be formed of glass, plastic, or polymer. The optical waveguide may include a nanopattern formed on an inner or outer surface of the optical waveguide, for example, a polygonal or curved grating structure. An example structure of the optical waveguide will be described below with reference to FIG. 3.

The vision sensor may include at least one of a camera sensor and a depth sensor.

Each of first cameras 265a and 265b, which is a camera for recognition, may be a camera used for three degrees of freedom (3DoF) and six degrees of freedom (6DoF) head tracking, hand detection, hand tracking, and spatial recognition. The first cameras 265a and 265b may mainly include a global shutter (GS) camera. The first cameras 265a and 265b may include two or more GS cameras because a stereo camera is required for head tracking and spatial recognition. A GS camera may have a more excellent performance compared to a rolling shutter (RS) camera, in terms of detecting and tracking a fine movement, such as a quick movement of a hand or a finger. For example, the GS camera may have a low image blur. The first cameras 265a and 265b may capture image data that is used for a simultaneous localization and mapping (SLAM) function for 6DoF spatial recognition and depth imaging. In addition, a user gesture recognition function may be performed based on the image data captured by the first cameras 265a and 265b.

Second cameras 270a and 270b, which are eye tracking (ET) cameras, may be used to capture image data for detecting and tracking the pupils of the user. The second cameras 270a and 270b will be described below with reference to FIG. 3.

A third camera 245 may be an image capturing camera. The third camera 245 may include a high-resolution (HR) camera to capture an HR image or a photo video (PV) image. The third camera 245 may include a color camera having functions for obtaining a high-quality image, such as, an automatic focus (AF) function and an optical image stabilizer (OIS). The third camera 245 may be a GS camera or an RS camera.

A fourth camera (e.g., a face recognition camera 430 of FIGS. 4A and 4B) is a face recognition camera, and a face tracking (FT) camera may be used to detect and track facial expressions of the user.

A depth sensor (not shown) may be a sensor configured to sense information for determining a distance to an object such as time of flight (TOF). TOF may, for example, refer to a technology for measuring a distance to an object using a signal (e.g., a near infrared ray, ultrasound, laser, etc.). A TOF-based depth sensor may transmit a signal from a transmitter and measure the signal by a receiver, thereby measuring a TOF of the signal.

The light sources 230a and 230b (e.g., illumination modules) may include an element (e.g., an LED) configured to emit light of various wavelengths. The illumination module may be attached at various positions depending on the purpose of use. In an example of use, a first illumination module (e.g., an LED element), attached around a frame of an AR glasses device, may emit light for assisting gaze detection when tracking a movement of the eyes with an ET camera. The first illumination module may include, for example, an IR LED of an infrared wavelength. In another example of use, a second illumination module (e.g., an LED element) may be attached around hinges 240a and 240b connecting a frame and a temple or attached in proximity to a camera mounted around a bridge connecting the frame. The second illumination module may emit light for supplementing ambient brightness when the camera captures an image. When it is not easy to detect a subject in a dark environment, the second illumination module may emit light.

Substrates 235a and 235b (e.g., printed-circuit boards (PCBs)) may support the components described above.

The PCB may be disposed on temples of the glasses. A flexible PCB (FPCB) may transmit an electrical signal to each module (e.g., a camera, a display, an audio module, and a sensor module) and another PCB. According to an embodiment, at least one PCB may be provided in a form including a first substrate, a second substrate, and an interposer disposed between the first substrate and the second substrate. In another example, the PCB may be disposed at a center of a set. An electrical signal may be transmitted to each module and the other PCB through the FPCB.

The other components may include, for example, at least one of a plurality of microphones (e.g., a first microphone 250a, a second microphone 250b, and a third microphone 250c), a plurality of speakers (e.g., a first speaker 255a and a second speaker 255b), a battery 260, an antenna, or a sensor (e.g., an acceleration sensor, a gyro sensor, a touch sensor, etc.).

Figure 3:
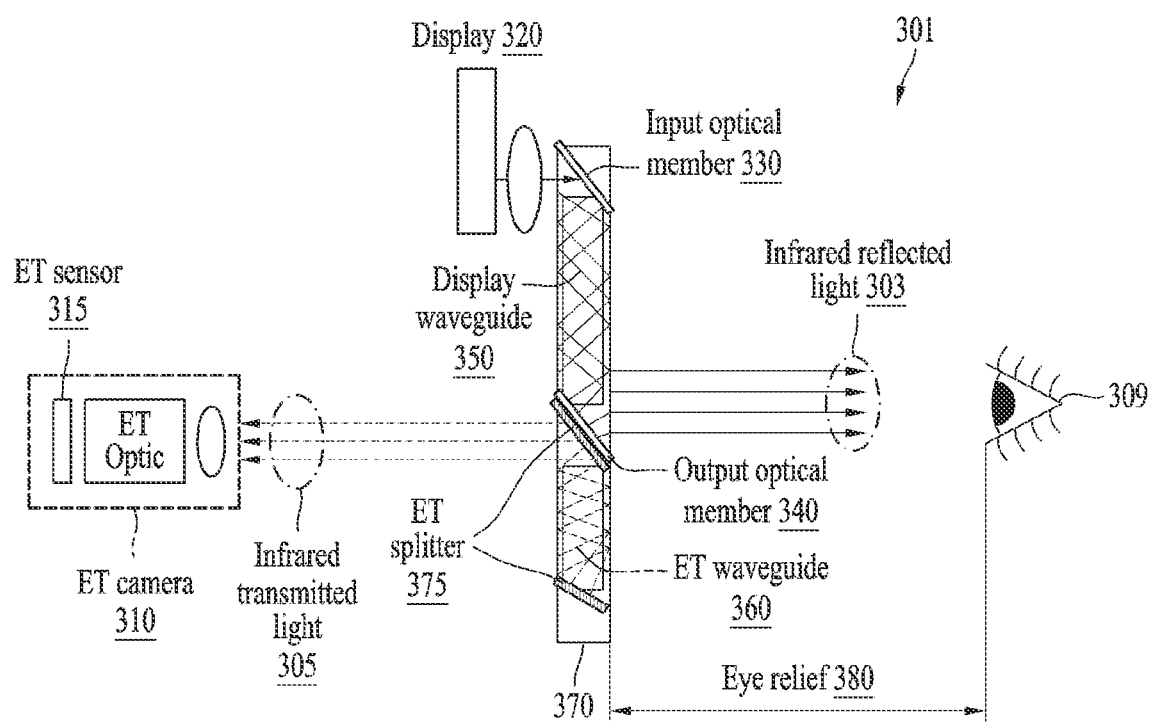
FIG. 3 is a diagram illustrating an example of an optical system of an eye tracking (ET) camera, a transparent member, and a display according to various embodiments.

FIG. 3 is a diagram illustrating an example of an optical system of an ET camera, a transparent member, and a display according to various embodiments.

FIG. 3 is a diagram illustrating an operation of an ET camera included in an electronic device according to an embodiment. FIG. 3 illustrates a process in which an ET camera 310 (e.g., the first camera 270a and second camera 270b of FIG. 2) of an electronic device 301 according to an embodiment tracks an eye 309 of a user, e.g., a gaze of the user, using light (e.g., infrared light) output from a display 320 (e.g., the first display 205 and the second display 210 of FIG. 2).

A second camera (e.g., the second cameras 270a and 270b of FIG. 2) may be the ET camera 310 that collects information for positioning a center of a virtual image projected onto the electronic device 301 according to a direction at which pupils of a wearer of the electronic device 301 gaze. The second camera may also include a GS camera to detect the pupils and track a rapid movement of the pupils. The ET cameras may be installed for a right eye and a left eye, and the ET cameras having the same camera performance and specifications may be used. The ET camera 310 may include an ET sensor 315. The ET sensor 315 may be included inside the ET camera 310. The infrared light output from the display 320 may be transmitted as an infrared reflected light 303 to the eye 309 of the user by a half mirror. The ET sensor 315 may detect an infrared transmitted light 305 that is generated when the infrared reflected light 303 is reflected from the eye 309 of the user. The ET camera 310 may track the eye 309 of the user, that is, the gaze of the user, based on a result of the detection by the ET sensor 315.

The display 320 may include a plurality of visible light pixels and a plurality of infrared pixels. The visible light pixels may include red (R), green (G), and blue (B) pixels. The visible light pixels may output visible light corresponding to a virtual object image. The infrared pixels may output infrared light. The display 320 may include, for example, micro LEDs, or OLEDs.

A display waveguide 350 and an ET waveguide 360 may be included in a transparent member 370 (e.g., the first transparent member 225a and the second transparent member 225b of FIG. 2). The transparent member 370 may be formed as, for example, a glass plate, a plastic plate, or a polymer, and may be transparently or translucently formed. The transparent member 370 may be disposed to face an eye of a user. In this case, a distance between the transparent member 370 and the eye 309 of the user may be referred to as an "eye relief" 380.

The transparent member 370 may include the waveguides 350 and 360. The transparent member 370 may include an input optical member 330 and an output optical member 340. In addition, the transparent member 370 may include an ET splitter 375 that splits input light into several waveguides.

According to an embodiment, light incident to one end of the display waveguide 350 may be propagated inside the display waveguide 350 by a nanopattern and may be provided to a user. In addition, the display waveguide 350 formed of a free-form prism may provide incident light as an image ray to the user through a reflection mirror. The display waveguide 350 may include at least one of a diffractive element (e.g., a diffractive optical element (DOE) or a holographic optical element (HOE)) or a reflective element (e.g., a reflection mirror). The display waveguide 350 may guide a display light (e.g., the image ray) emitted from the light source to the eyes of the user, using at least one of the diffractive element or the reflective element included in the display waveguide 350. For reference, although FIG. 3 illustrates that the output optical member 340 is separate from the ET waveguide 360, the output optical member 340 may be included in the ET waveguide 360.

According to an embodiment, the diffractive element may include the input optical member 330 and the output optical member 340. For example, the input optical member 330 may refer, for example, to an "input grating area". The output optical member 340 may refer, for example, to an "output grating area". The input grating area may serve as an input end that diffracts (or reflects) light, output from a micro-LED, to transmit the light to a transparent member (e.g., the first transparent member and the second transparent member) of a screen display portion. The output grating area may serve as an exit that diffracts (or reflects), to the eyes of the user, the light transmitted to the transparent member (e.g., the first transparent member and the second transparent member) of a waveguide.

According to an embodiment, the reflective element may include a total reflection optical element or a total reflection waveguide for total internal reflection (TIR). For example, TIR, which is one scheme for inducing light, may form an angle of incidence such that light (e.g., a virtual image) entering through the input grating area is completely reflected from one surface (e.g., a specific surface) of the waveguide, to completely transmit the light to the output grating area.

In an embodiment, a light path of the light emitted from the display 320 may be guided by the waveguide through the input optical member 330. The light moving the inside of the waveguide may be guided toward the eyes of the user through the output optical member 340. A screen display portion may be determined based on the light emitted toward the eyes of the user.

Figure 4A:
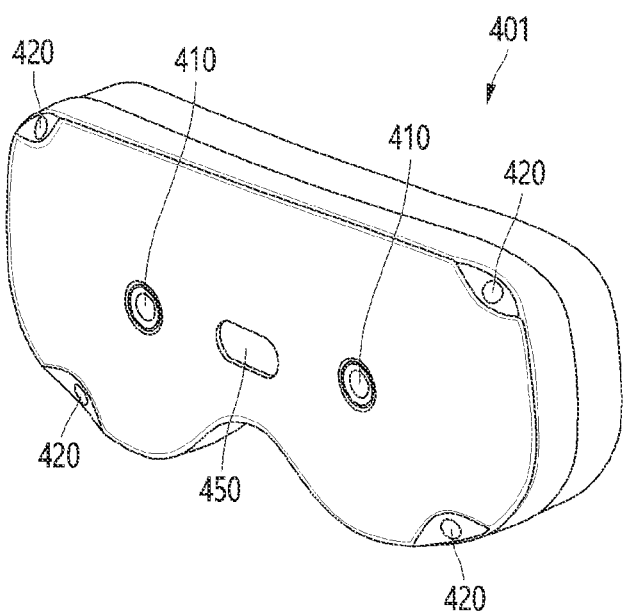
FIGS. 4A and 4B are diagrams illustrating an example video see-through (VST) device according to various embodiments.
Figure 4B:
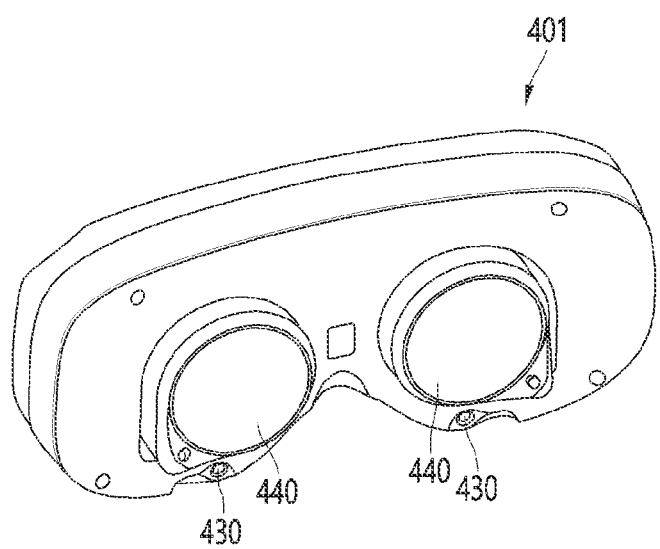

FIGS. 4A and 4B are diagrams illustrating an example video see-through (VST) device according to various embodiments.

An example of a transparent display has been described above with reference to FIGS. 2 and 3, but example embodiments are not limited thereto. Referring to FIGS. 4A and 4B, an electronic device 401 may include an opaque display 440. The electronic device 401 may generate a scene image corresponding to a field of view (FOV) of a user, based on image data captured using camera sensors 410 and 420 (e.g., the first cameras 265a and 265b or the third camera 245 for image capturing of FIG. 2). The electronic device 401 may output the generated scene image through the opaque display 440. The electronic device 401 may provide a left eye of the user with a scene image corresponding to an FOV of the left eye and may provide a right eye of the user with a scene image corresponding to an FOV of the right eye, through the display 440 and individual lenses. Accordingly, the user may receive visual information corresponding to an FOV through a video image provided based on the camera, the display 440, and the lenses. The electronic device 401 shown in FIGS. 4A and 4B may also be referred to, for example, as a VST device. The electronic device 401 may include a face recognition camera 430.

For reference, the arrangement of the camera sensors 410 and 420, a depth sensor 450, the display 440, or the lenses in the electronic device 401 shown in FIGS. 4A and 4B is merely an example, and example embodiments are not limited to this arrangement.

Figure 5:
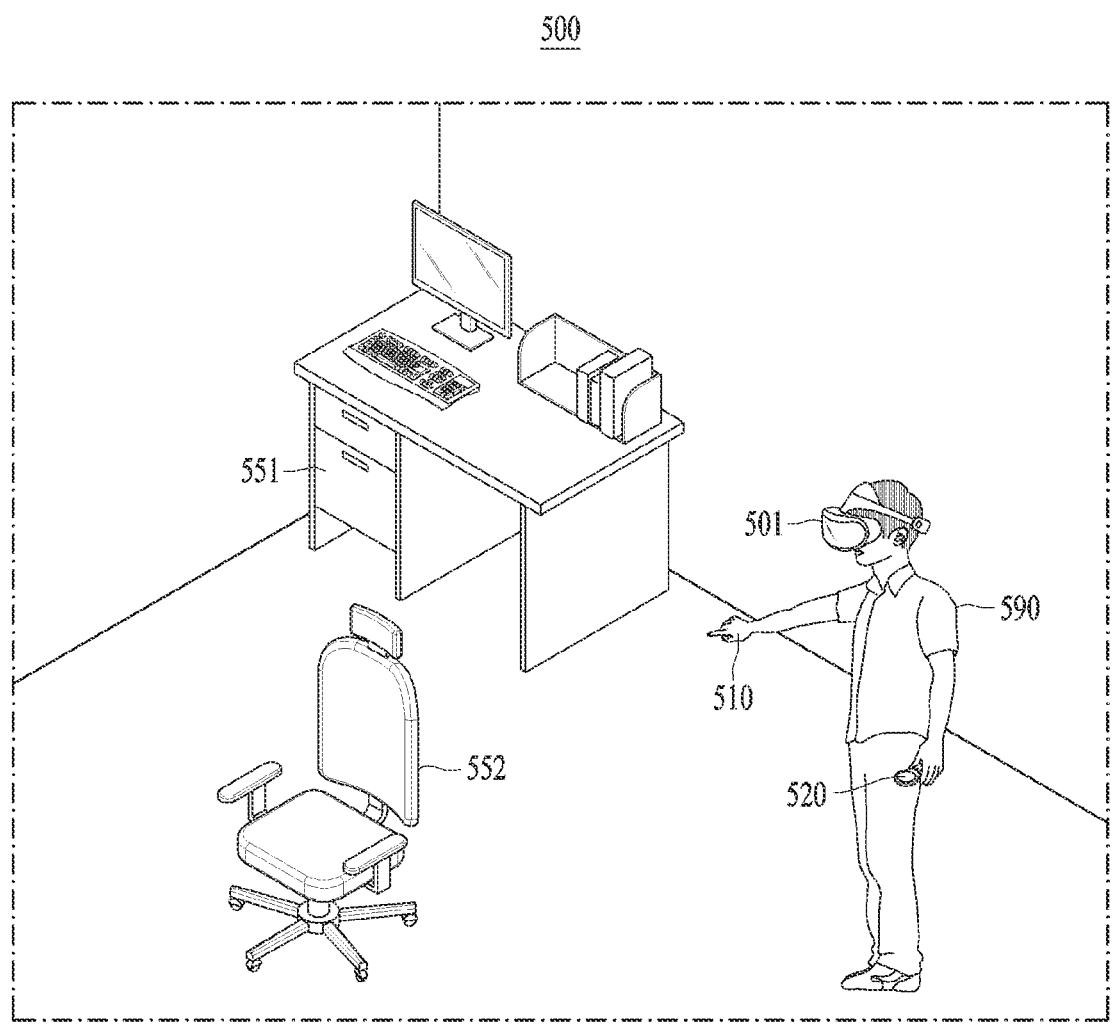
FIG. 5 is a diagram illustrating an example of construction of virtual space and input from and output to a user in a virtual space according to various embodiments.

FIG. 5 is a diagram illustrating an example of construction of virtual space and input from and output to a user in a virtual space according to various embodiments.

An electronic device 501 (e.g., the electronic device 101 of FIG. 1, the electronic device 201 of FIG. 2, the electronic device 301 of FIG. 3, or the electronic device 401 of FIGS.

4A and 4B) may obtain spatial information on a physical space in which sensors are located using the sensors. The spatial information may include a geographic location of the physical space in which the sensors are located, a size of the space, an appearance of the space, a position of a physical object 551 disposed in the space, a size of the physical object 551, an appearance of the physical object 551, and illuminant information. The appearance of the space and the physical object 551 may include at least one of a shape, texture, or color of the space and the physical object 551. The illumination information, which is information on a light source that emits light acting in the physical space, may include at least one of an intensity, a direction, or a color of illumination. The sensor described above may collect information for providing AR. For example, with reference to the AR device shown in FIGS. 2 to 4, the sensor may include a camera and a depth sensor. However, the sensor is not limited thereto, and the sensor may further include at least one of an infrared sensor, a depth sensor (e.g., a light detection and ranging (lidar) sensor, a radio detection and ranging (radar) sensor, or a stereo camera), a gyro sensor, an acceleration sensor, or a geomagnetic sensor.

The electronic device 501 may collect the spatial information over a plurality of time frames. For example, in each time frame, the electronic device 501 may collect information on a space of a portion belonging to a scene within a sensing range (e.g., a field of view (FOV)) of a sensor at a position of the electronic device 501 in the physical space. The electronic device 501 may track a change (e.g., a position movement or a state change) of an object over time by analyzing the spatial information of multiple time frames. The electronic device 501 may integrally analyze the spatial information collected through the plurality of sensors, thereby obtaining integrated spatial information (e.g., an image obtained by spatially stitching scenes around the electronic device 501 in the physical space) of an integrated sensing range of the plurality of sensors.

The electronic device 501 according to an embodiment may analyze the physical space as three-dimensional (3D) information, using various input signals (e.g., sensing data of an RGB camera, an infrared sensor, a depth sensor, or a stereo camera) of the sensor. For example, the electronic device 501 may analyze at least one of the shape, size, or position of the physical space, and the shape, size, or position of the physical object 551.

For example, the electronic device 501 may detect an object captured in a scene corresponding to an FOV of a camera, using sensing data (e.g., a captured image) of the camera. The electronic device 501 may determine, from a two-dimensional (2D) scene image of the camera, a label of the physical object 551 (e.g., information indicating classification of an object, including values indicating a chair, a monitor, or a plant) and an area (e.g., a bounding box) occupied by the physical object 551 in the 2D scene. Accordingly, the electronic device 501 may obtain 2D scene information at a position where a user 590 is viewing. In addition, the electronic device 501 may also calculate a position of the electronic device 501 in the physical space based on the sensing data of the camera.

The electronic device 501 may obtain position information of the user 590 and depth information of a real space in a viewing direction using sensing data (e.g., depth data) of a depth sensor. The depth information, which is information indicating a distance from the depth sensor to each point, may be expressed in the form of a depth map. The electronic device 501 may analyze a distance in the unit of each pixel at a 3D position at which the user 590 is viewing.

The electronic device 501 may obtain information including a 3D point cloud and a mesh using various pieces of sensing data. The electronic device 501 may obtain a plane, a mesh, or a 3D coordinate point cluster that configures a space by analyzing the physical space. The electronic device 501 may obtain a 3D point cloud representing physical objects based on the information obtained as described above.

The electronic device 501 may obtain information including at least one of 3D position coordinates, 3D shapes, or 3D sizes (e.g., 3D bounding boxes) of the physical objects disposed in the physical space by analyzing the physical space.

Accordingly, the electronic device 501 may obtain physical object information detected in the 3D space and semantic segmentation information on the 3D space. The physical object information may include at least one of a position, an appearance (e.g., a shape, texture, and color), or a size of the physical object 551 in the 3D space. The semantic segmentation information, which is information obtained by semantically segmenting the 3D space into partial spaces, may include, for example, information indicating that the 3D space segmented into an object and a background and information indicating that the background segmented into a wall, a floor, and a ceiling. As described above, the electronic device 501 may obtain and store 3D information (e.g., spatial information) of the physical object 551 and the physical space. The electronic device 501 may store 3D position information of the user 590 in the space together with the spatial information.

The electronic device 501 according to an embodiment may construct a virtual space 500 based on the physical positions of the electronic device 501 and/or the user 590. The electronic device 501 may generate the virtual space 500 by referring to the spatial information described above. The electronic device 501 may generate the virtual space 500 of the same scale as the physical space based on the spatial information and dispose objects in the generated virtual space 500. The electronic device 501 may provide a complete VR to the user 590 by outputting an image that substitutes the entire physical space. The electronic device 501 may also provide mixed reality (MR) or AR by outputting an image that substitutes a portion of the physical space. Although the construction of the virtual space 500 based on the spatial information obtained by the analysis of the physical space has been described, the electronic device 501 may also construct the virtual space 500 regardless of the physical position of the user 590. In the disclosure, the virtual space 500, which is a space corresponding to AR or VR, may also be referred to as a metaverse space.

For example, the electronic device 501 may provide virtual graphic representation that substitutes at least a partial space of the physical space. The electronic device 501 based on OST may overlay the virtual graphic representation on a screen area corresponding to the at least partial space in a screen display portion and output the virtual graphic representation. The electronic device 501 based on VST may output an image generated by substituting an image area corresponding to at least a partial space of a space image corresponding to a physical space rendered based on the spatial information with virtual graphic representation. The electronic device 501 may substitute at least a portion of a background in the physical space with virtual graphic representation, but example embodiments are not limited in this respect. The electronic device 501 may perform additional arrangement of a virtual object 552 in the virtual space 500 based on the spatial information without changing the background.

The electronic device 501 may dispose and output the virtual object 552 in the virtual space 500. The electronic device 501 may set a manipulation area for the virtual object 552 in a space occupied by the virtual object 552 (e.g., a volume corresponding to an appearance of the virtual object 552). The manipulation area may be an area where a manipulation of the virtual object 552 occurs. In addition, the electronic device 501 may substitute the physical object 551 with the virtual object 552 and output the virtual object 552. The virtual object 552 corresponding to the physical object 551 may have the same or similar shape as or to the corresponding physical object 551. However, example embodiments are not limited in this respect, and the electronic device 501 may set only the manipulation area in a space occupied by the physical object 551 or at a position corresponding to the physical object 551, without outputting the virtual object 552 that substitutes the physical object 551. That is, the electronic device 501 may transmit, to the user 590, visual information representing the physical object 551 (e.g., light reflected from the physical object 551 or an image obtained by capturing the physical object 551) without a change, and set the manipulation area in the physical object 551. The manipulation area may be set to have the same shape and volume as the space occupied by the virtual object 552 or the physical object 551, but example embodiments are not limited thereto. The electronic device 501 may set the manipulation area to be smaller than the space occupied by the virtual object 552 or the space occupied by the physical object 551.

According to an embodiment, the electronic device 501 may arrange the virtual object 552 (e.g., an avatar object) representing the user 590 in the virtual space 500. When the avatar object is provided in a first-person view, the electronic device 501 may visualize a graphic representation corresponding to a portion of the avatar object (e.g., a hand, a body, or a leg) to the user 590 through the display described above (e.g., the OST display or VST display). However, examples are not limited thereto, and when the avatar object is provided in a third-person view, the electronic device 501 may visualize a graphic representation corresponding to an entire shape (e.g., a back view) of the avatar object to the user 590 through the display described above. The electronic device 501 may provide the user 590 with an experience integrated with the avatar object.

In addition, the electronic device 501 may provide an avatar object of another user who enters the same virtual space 500. The electronic device 501 may receive feedback information that is the same as or similar to feedback information (e.g., information based on at least one of visual sensation, auditory sensation, or tactile sensation) provided to another electronic device 501 entering the same virtual space 500. For example, when an object is disposed in a predetermined virtual space 500 and a plurality of users access the virtual space 500, the electronic devices 501 of the plurality of users may receive feedback information (e.g., a graphic representation, a sound signal, or a haptic feedback) of the same object disposed in the virtual space 500 and provide the feedback information to the respective users 590.

The electronic device 501 may detect an input to an avatar object of another electronic device 501 and may receive feedback information from the avatar object of the other electronic device 501. An exchange of inputs and feedback for each virtual space 500 may be performed by a server (e.g., the server 108 of FIG. 1). For example, the server (e.g., a server providing a metaverse space) may transmit, to the users 590, inputs and feedback between the avatar object of the user 590 and an avatar object of another user. However, examples are not limited thereto, and the electronic device 501 may establish direct communication with another electronic device 501 to provide an input based on an avatar object or receive feedback, not via the server.

For example, based on detecting an input of the user 590 that selects a manipulation area, the electronic device 501 may determine that the physical object 551 corresponding to the selected manipulation area is selected by the user 590. The input of the user 590 may include at least one of a gesture input made using a body part (e.g., a hand or eye) or an input made by using a separate accessory device for VR.

The gesture input may be an input corresponding to a gesture identified by tracking a body part 510 of the user 590 and may include, for example, an input indicating or selecting an object. The gesture input may include at least one of a gesture by which a body part (e.g., a hand) points toward an object for a predetermined period of time or more, a gesture by which a body part (e.g., a finger, an eye, or a head) points at an object, or a gesture by which a body part and an object contact each other spatially. A gesture of pointing to an object with an eye may be identified based on eye tracking. A gesture of pointing to an object with a head may be identified based on head tracking.

Tracking the body part 510 of the user 590 may be mainly performed based on a camera of the electronic device 501 but is not limited thereto. The electronic device 501 may track the body part 510 based on a cooperation of sensing data of a vision sensor (e.g., image data of a camera and depth data of a depth sensor) and information collected by accessory devices described below (e.g., controller tracking or finger tracking in a controller). Finger tracking may be performed by sensing a distance or contact between an individual finger and the controller based on a sensor (e.g., an infrared sensor) embedded in the controller.

Accessory devices for VR may include, for example, a ride-on device, a wearable device, a controller device 520, or other sensor-based devices. The ride-on device, which is a device operated by the user 590 riding thereon, may include, for example, at least one of a treadmill-type device and a chair-type device. The wearable device, which is a manipulation device worn on at least a part of the body of the user 590, may include, for example, at least one of a full body suit-type or a half body suit-type controller, a vest-type controller, a shoe-type controller, a bag-type controller, a glove-type controller (e.g., a haptic glove), or a face mask-type controller. The controller device 520 may include an input device (e.g., a stick-type controller or a firearm) manipulated by a hand, foot, toe, or other body parts 510.

The electronic device 501 may establish direct communication with an accessory device and track at least one of a position or motion of the accessory device, but examples are not limited thereto. The electronic device 501 may communicate with the accessory device via a base station for VR.

For example, the electronic device 501 may determine that the virtual object 552 is selected, based on detecting an act of gazing at the virtual object 552 for a predetermined period of time or more through the eye gaze tracking technology described above. In another example, the electronic device 501 may recognize a gesture of pointing to the virtual object 552 through a hand tracking technology. The electronic device 501 may determine that the virtual object 552 is selected, based on that a direction in which a tracked hand points indicates the virtual object 552 for a predetermined period of time or more or that a hand of the user 590 contacts or enters an area occupied by the virtual object 552 in the virtual space 500. The electronic device 501 may provide feedback, which will be described below, as a response to the input of the user 590.

The feedback may include visual feedback, auditory feedback, tactile feedback, olfactory feedback, and/or gustatory feedback. The feedback may be rendered by the server 108, the electronic device 101, or the external electronic device 102 as described above with reference to FIG. 1.

The visual feedback may include an operation of outputting an image through the display (e.g., a transparent display or an opaque display) of the electronic device 501.

The auditory feedback may include an operation of outputting a sound through a speaker of the electronic device 501.

The tactile feedback may include force feedback that simulates a weight, a shape, a texture, a dimension, and dynamics. For example, the haptic glove may include a haptic element (e.g., an electric muscle) for simulating tactile sensation by tensing and relaxing the body of the user 590. The haptic element in the haptic glove may act as a tendon. The haptic glove may provide haptic feedback to the entire hand of the user 590. The electronic device 501 may provide feedback that represents a shape, a size, and stiffness of an object through the haptic glove. For example, the haptic glove may generate a force that simulates a shape, a size, and stiffness of an object. The exoskeleton of the haptic glove (or a suit-type device) may include a sensor and a finger motion measurement device, and may transmit a cable-pulling force (e.g., an electromagnetic, direct current (DC) motor-based, or pneumatic force) to fingers of the user 590 to transmit tactile information to the body. Hardware providing the tactile feedback may include a sensor, an actuator, a power source, and a wireless transmission circuit. The haptic glove may operate by inflating and deflating an inflatable air bladder on a surface of the glove.

The electronic device 501 may provide feedback to the user 590 based on selecting an object in the virtual space 500. For example, the electronic device 501 may output a graphic representation (e.g., a representation of highlighting the selected object) indicating the selected object through the display. In another example, the electronic device 501 may output a sound (e.g., a voice) notifying the selected object through a speaker. In still another example, the electronic device 501 may provide a haptic motion that simulates a tactile sensation of a corresponding object to the user 590 by transmitting an electrical signal to a haptic supporting accessory device (e.g., the haptic glove).

Figure 6:
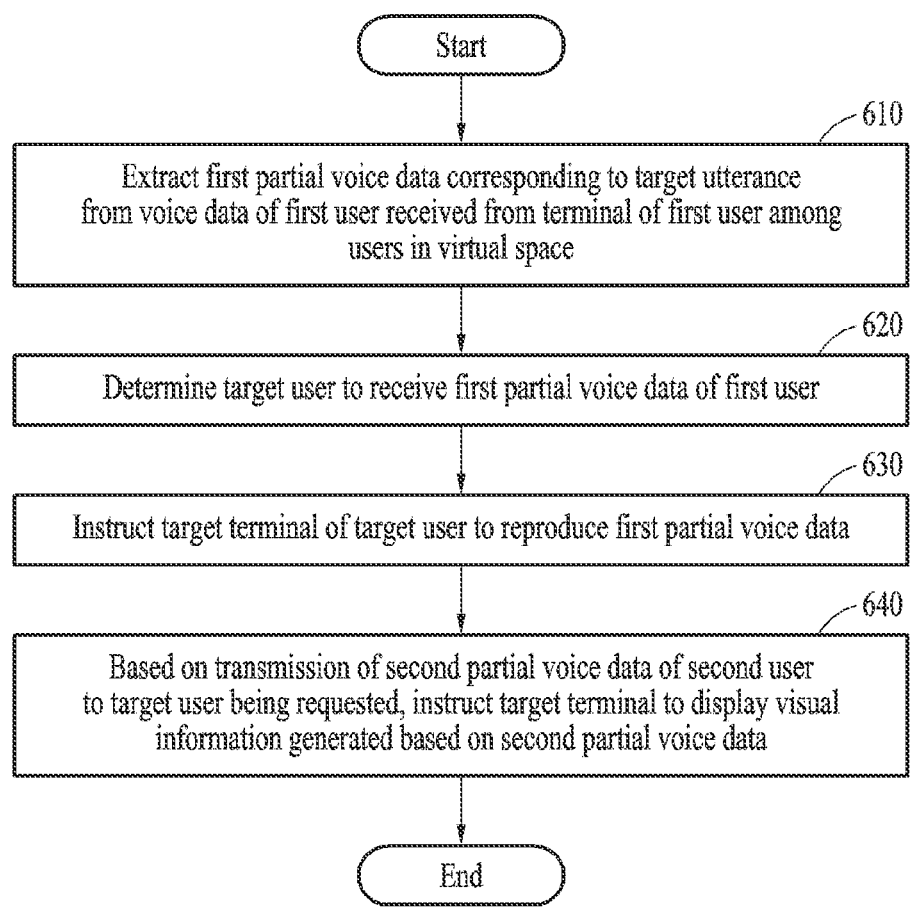
FIG. 6 is a diagram illustrating an example operation of a server instructing a target terminal to reproduce voice data and display visual information according to various embodiments.

FIG. 6 is a diagram illustrating an example operation of a server instructing a target terminal to reproduce voice data and display visual information according to various embodiments.

A server according to an embodiment (e.g., server 108 of FIG. 1) may establish a virtual space. The server may transmit voice data (or partial voice data) between a plurality of users entering the constructed virtual space.

In operation 610, the server may receive voice data of a first user from a terminal of the first user among the users in the virtual space. The server may extract first partial voice data from the received voice data of the first user. The users in the virtual space may refer to one or more users entering a metaverse space provided by the server.

The first partial voice data, as partial data of the voice data of the first user, may refer, for example, to partial data corresponding to a target utterance. The target utterance may represent, for example, an utterance, from an utterance of the first user, that is transmitted to some users among the users in the virtual space and is restricted from being transmitted to some other users. However, example embodiments are not limited in this respect, and the target utterance may be transmitted to all the users in the virtual space or may be transmitted to an AI server. The extraction of the first partial voice data will be described below with reference to FIG. 8. An embodiment in which the target utterance is transmitted to an AI server will be described below with reference to FIG. 12.

In operation 620, the server may determine a target user to receive the first partial voice data of the first user. The target user may refer, for example, to a user in the virtual space to receive the first partial voice data. For example, the target user may include, for example, a user in the virtual space who is designated as a listener of the target utterance by the first user.

According to an embodiment, the server may determine the target user based on at least one of a gesture input of the first user or the first partial voice data.

The server may obtain the gesture input of the first user. For example, the server may detect a gesture of the first user based on sensing data. The sensing data may include data sensed by the terminal of the first user or data sensed by an external device (e.g., an accessory device for VR) connected to the terminal of the first user. The data sensed by the external device connected to the terminal of the first user may be transmitted to the terminal of the first user. For example, the terminal of the first user may detect the gesture of the first user based on the sensing data. The terminal of the first user may transmit the gesture input of the first user to the server based on detecting the gesture of the first user. The server may receive the gesture input of the first user from the terminal of the first user.

According to an embodiment, the server may detect a gesture for at least one user among the users in the virtual space. The gesture input for the user may include a gesture input of indicating or selecting an object related to the corresponding user. The object related to the user may refer, for example, to an object in the virtual space that may be used to indicate the corresponding user. For example, the object related to the user may include at least one of an avatar object of the corresponding user or a virtual object mapped to the corresponding user. The virtual object mapped to the user may include, for example, a virtual object representing a name tag, chair, or desk of the corresponding user, and a virtual object positioned in a sub-virtual space corresponding to a work space of the corresponding user. The server may determine at least one user indicated by the gesture input of the first user as the target user.

According to an embodiment, the server may detect a keyword indicating at least one user among the users in the virtual space from at least a portion of the first partial voice data. The keyword indicating a user may be a word used to indicate a corresponding user and may include, for example, one or a combination of two or more of last name, first name, full name, job title, responsibility, nickname, or appellation of the corresponding user.

For example, the server may detect a keyword indicating at least one user from a portion of the first partial voice data (e.g., a portion corresponding to a starting part of the partial voice data) by analyzing the first partial voice data. The portion of the first partial voice data may refer to, for example, partial data for a period from a start time point of the first partial voice data to a time point after a predetermined length of time. The server may determine, as the target user, at least one user indicated by the keyword detected from the portion of the first partial voice data.

In operation 630, the server may instruct a target terminal of the target user to reproduce the first partial voice data. The target terminal may include an electronic device (e.g., the electronic device 101 of FIG. 1, the electronic device 201 of FIG. 2, the electronic device 301 of FIG. 3, or the electronic device 401 of FIGS. 4A and 4B) of the target user. The target terminal may receive an instruction to reproduce the first partial voice data from the server. The target terminal may reproduce the first partial voice data received from the server.

According to an embodiment, the server may instruct to reproduce the first partial voice data through a module of the target terminal. The server may transmit the first partial voice data to the target terminal. The target terminal may receive the first partial voice data from the server. The target terminal may reproduce the first partial voice data based on receiving the instruction to reproduce the first partial voice data from the server. For example, the target terminal (e.g., the electronic device 101 of FIG. 1) may include a sound output module (e.g., the sound output module 155 of FIG. 1) and/or an audio module (e.g., the audio module 170 of FIG. 1). The target terminal may output a sound based on the first partial voice data to the outside of the target terminal through the sound output module and/or the audio module of the target terminal.

However, examples are not limited thereto, and the target terminal may reproduce the first partial voice data through an external electronic device (e.g., the electronic device 102 of FIG. 1, for example, a speaker or headphones) connected to the target terminal. According to an embodiment, the server may instruct to reproduce the first partial voice data through the external electronic device connected to the target terminal. The server may transmit the first partial voice data to the target terminal. The target terminal may receive the first partial voice data from the server. The target terminal may instruct the external electronic device directly or wirelessly connected to the target terminal to reproduce the first partial voice data based on receiving the instruction to reproduce the first partial voice data from the server. The target terminal may output a sound based on the first partial voice data through the external electronic device.

According to an embodiment, the server may instruct to reproduce the first partial voice data at a volume based on a distance between an avatar object of the first user and an avatar object of the target user in the virtual space. When the distance between the avatar object of the first user and the avatar object of the target user in the virtual space is a first distance, the server may instruct the target terminal to reproduce the first partial voice data at a first volume. When the distance between the avatar object of the first user and the avatar object of the target user in the virtual space is a second distance that is longer than the first distance, the server may instruct the target terminal to reproduce the first partial voice data at a second volume that is lower than the first volume. For example, the server may determine a volume for reproducing the first partial voice data as a value inversely proportional to the distance between the first user and the target user in the virtual space. The server may instruct the target terminal to reproduce the first partial voice data at the determined volume.

The server may restrict the transmission of the first partial voice data to a user other than the determined target user among the users in the virtual space.

According to an embodiment, the server may restrict the transmission of the first partial voice data to a user other than the determined target user. For example, the server may instruct a terminal of the other user to restrict the reproduction of the first partial voice data. For example, the server may instruct the terminal of the other user to restrict display of visual information generated based on the first partial voice data.

According to an embodiment, the server may restrict the transmission of the first partial voice data to the user other than the target user independently of the distance between the avatar object of the first user and the avatar object of the other user in the virtual space. For example, even if the avatar object of the first user is positioned closer to an avatar object of the other user than the avatar object of the target user in the virtual space, the server may transmit the first partial voice data of the first user to the target user and may restrict the transmission of the first partial voice data of the first user to the other user.

In operation 640, the server may instruct the target terminal to display visual information generated based on second partial voice data based on transmission of the second partial voice data of a second user to the target user being requested while the target terminal reproduces the first partial voice data. The visual information generated based on the second partial voice data may include a screen having a text corresponding to an utterance included in the second partial voice data.

According to an embodiment, the server may convert an utterance of the user included in the second partial voice data into a text. The server may generate a screen having the converted text. The server may transmit the generated screen to the target terminal. The target terminal may display the screen received from the server through a display of the target terminal. However, the generating of the visual information is not limited to the server. According to an embodiment, the server may transmit the second partial voice data to the target terminal. The target terminal may convert the utterance of the user included in the second partial voice data received from the server into a text. The target terminal may generate a screen having the converted text. The target terminal may display the generated screen through the display.

The server may instruct the target terminal to restrict the display of the second partial voice data based on transmission of the second partial voice data to the target user being requested while the target terminal reproduces the first partial voice data.

According to an embodiment, the server may be requested to transmit a plurality of pieces of partial voice data (e.g., the first partial voice data of the first user and the second partial voice data of the second user) to the target user. For example, the transmission of the first partial voice data to the target user may be requested. The target terminal may reproduce the first partial voice data based on receiving the instruction to reproduce the first partial voice data from the server. While the target terminal reproduces the first partial voice data, the transmission of the second partial voice data to the target user may be requested. The server may instruct the target terminal to restrict the reproduction of the second partial voice data. The target terminal may restrict the reproduction of the second partial voice data. For example, the target terminal may restrict the reproduction of other voice data (e.g., the second partial voice data) while reproducing one (e.g., the first partial voice data) of the plurality of pieces of partial voice data.

Figure 7:
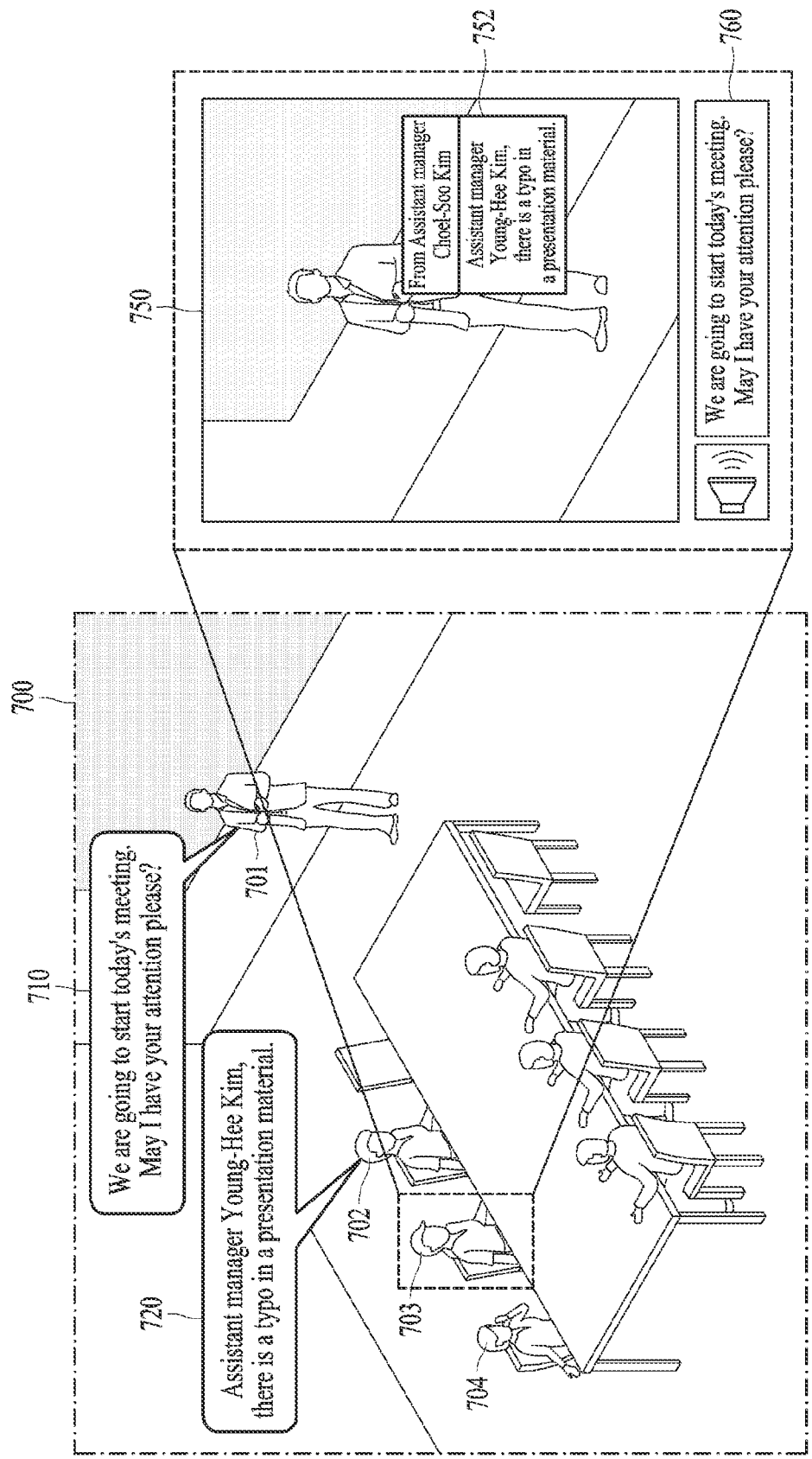
FIG. 7 is a diagram illustrating an example in which a server transmits voice data between a plurality of users entering a virtual space according to various embodiments.

FIG. 7 is a diagram illustrating an example in which a server transmits voice data between a plurality of users entering a virtual space according to various embodiments.

The server may provide a virtual space 700 (e.g., the virtual space 500 of FIG. 5). For example, the virtual space 700 may correspond to a conference room. The server may provide avatar objects of users to a plurality of users entering the virtual space 700. In the present disclosure, a user entering the virtual space may be expressed as a user in the virtual space.

According to an embodiment, the virtual space 700 may be constructed based on a physical space (e.g., a conference room). For example, as described above with reference to FIG. 5, the server may provide the virtual space 700 corresponding to a physical space (e.g., a conference room) where the user is positioned, based on a physical position of the user. The user entering the virtual space 700 may include at least one of a user positioned in a physical space (e.g., a conference room) corresponding to the virtual space 700 or a user positioned in a physical space (e.g., user's home) other than the physical space (e.g., a conference room) corresponding to the virtual space 700. For example, when the plurality of users have entered the virtual space 700, some users of the plurality of users may be positioned in the physical space corresponding to the virtual space and some other users of the plurality of users may not be positioned in the physical space corresponding to the virtual space.

In FIG. 7, the plurality of users (e.g., a first user, a second user, a third user, and a fourth user) may have entered the virtual space 700. The server may provide avatar objects 701, 702, 703, and 704 of the plurality of users who have entered the virtual space 700. For example, the first avatar object 701 may represent the first user. The second avatar object 702 may represent the second user. The third avatar object 703 may represent the third user. The fourth avatar object 704 may represent the fourth user.

The server may receive voice data of the first user from a terminal of the first user. The server may extract first partial voice data 710 from the voice data of the first user. The server may determine the first user, the second user, the third user, and the fourth user as target users to receive the first partial voice data 710. The server may transmit the first partial voice data 710 to the plurality of users determined as the target users. For example, the server may instruct the terminal of the first user to reproduce the first partial voice data 710. The server may instruct a terminal of the second user to reproduce the first partial voice data 710. The server may instruct a terminal of the third user to reproduce the first partial voice data 710. The server may instruct a terminal of the fourth user to reproduce the first partial voice data 710. As shown in FIG. 7, in operation 760, the terminal of the third user determined as the target user may reproduce the first partial voice data 710. Based on the instruction to reproduce the first partial voice data 710 being received by the terminal of the third user from the server, the first partial voice data 710 may be transmitted to the third user as the first partial voice data 710 is reproduced by the terminal of the third user.

The server may receive voice data of the second user from the terminal of the second user. The server may extract second partial voice data 720 from the voice data of the second user. The server may determine the third user as a target user to receive the second partial voice data 720 based on a keyword (e.g., "Young-hee Kim" of FIG. 7) detected from the second partial voice data 720 indicating the third user. While the terminal of the third user reproduces the first partial voice data 710, the transmission of the second partial voice data 720 to the third user may be requested. The server may transmit the second partial voice data 720 to the third user. The server may restrict the transmission of the second partial voice data 720 to users (e.g., the first user and the fourth user) other than the target user of the second partial voice data 720.

The server may instruct the terminal of the third user to display visual information 752 generated based on the second partial voice data 720, based on the transmission of the second partial voice data 720 of the second user to the third user being requested while the terminal of the third user reproduces the first partial voice data 710. The terminal of the third user may display the visual information 752 generated based on the second partial voice data 720.

The terminal of the third user may display a screen 750 including the visual information 752 generated based on the second partial voice data 720, based on receiving the instruction to display the visual information 752 generated based on the second partial voice data 720 from the server. The visual information 752 may have a text converted from the utterance of the second user including the second partial voice data. The visual information 752 may have a text indicating the second user (e.g., "Assistant manager Cheolsoo Kim" of FIG. 7) who is an utterer of the utterance included in the second partial voice data. As the terminal of the third user displays the visual information 752, the second partial voice data 720 may be transmitted to the third user.

The server may instruct the terminal of the third user to restrict the reproduction of the second partial voice data 720. The terminal of the third user may restrict the reproduction of the second partial voice data 720, based on receiving the instruction to restrict the reproduction of the second partial voice data 720 from the server.

Figure 8:
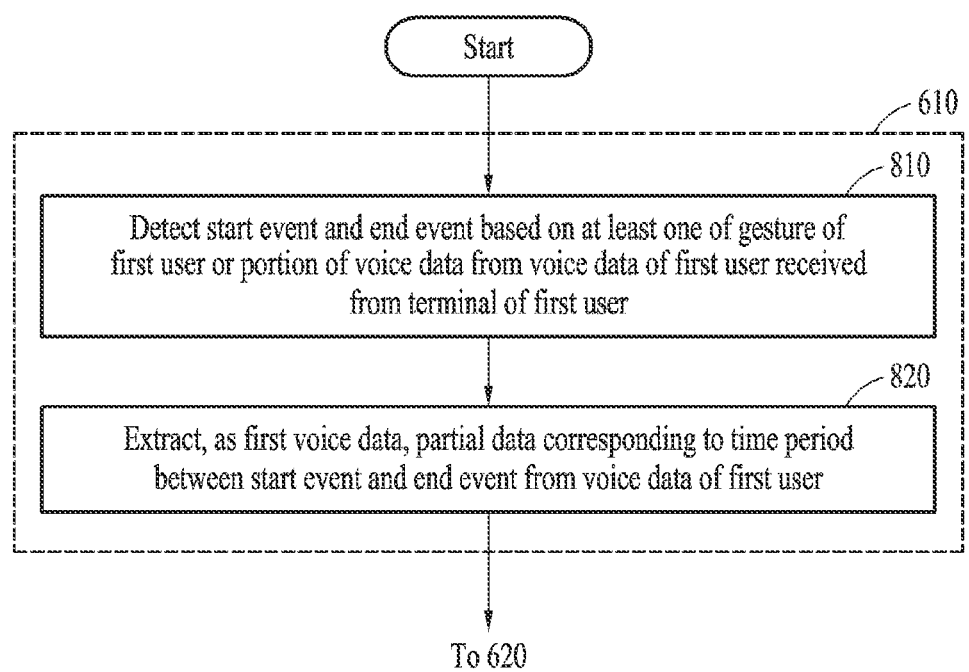
FIG. 8 is a diagram illustrating an example operation of a server extracting first partial voice data according to various embodiments.

FIG. 8 is a diagram illustrating an example operation of a server extracting first partial voice data according to various embodiments.

In operation 810, the server may detect a start event and an end event from the voice data of the first user. The start event may correspond to the start of a target utterance. The end event may correspond to the end of a target utterance. The target utterance may, for example, refer to an utterance to be transmitted from the first user to the target user.

The server according to an embodiment may detect the start event from the voice data of the first user based on at least one of a gesture input of the first user or a portion of the voice data of the first user.

According to an embodiment, the server may detect a gesture for at least one user among the users in the virtual space. The server may detect the start event based on detecting gestures for other users.

According to an embodiment, the server may detect the start event based on the voice data of the first user.

For example, the server may detect the start event based on a volume of the voice data of the first user. The server may detect the start event based on a volume of the voice data of the first user being changed from a value less than or equal to a threshold value to a value greater than the threshold value.

For example, the server may detect a keyword indicating the start event from the voice data of the first user. The server may detect the start event based on detecting the keyword indicating the start event from the voice data of the first user. The keyword indicating the start event may include, for example, one or a combination of two or more of a greeting (e.g., "Hi" or "Hello"), a self-introduction (e.g., "I am XXX from Team A"), a keyword indicating at least one user, or a keyword indicating an AI server (or a voice assistant application). As will be described below with reference to FIG. 12, the keyword indicating an AI server may be a word that may be used to indicate an AI server and may include, for example, a name of an AI server or a word preset by a user (e.g., a wakeup keyword).

The server according to an embodiment may detect the end event based on at least one of a gesture input of the first user or a portion of the voice data.

According to an embodiment, the server may detect a gesture for at least one user among the users in the virtual space. The server may detect the gesture for the at least one user for a predetermined length of time. The server may detect the end event, based on detecting a removal of the gesture for the at least one user after the gesture for the at least one user is detected for the predetermined length of time.

For example, the server may detect a gesture by which a finger of the first user points to the avatar object of the target user for the predetermined length of time. After that, the server may detect that the gesture of the first user for the target user is removed. The server may detect the end event based on detecting the removal of the gesture of the first user for the target user.

According to an embodiment, the server may detect the end event based on the voice data of the first user.

For example, the server may detect the end event based on a volume of the voice data of the first user. For example, the server may detect the end event based on a volume of the voice data of the first user being changed from a value greater than a threshold value to a value less than or equal to the threshold value. For example, the server may detect the end event based on the volume of the voice data of the first user being less than or equal to the threshold value for a predetermined length of time. The threshold value used to detect the end event may be independent of the threshold value used to detect the start event. For example, the server may detect the end event based on the volume of the voice data of the first user being less than or equal to the threshold value corresponding to "muted" for the predetermined length of time.

For example, the server may detect a keyword indicating the end event from the voice data of the first user. The server may detect the end event based on detecting the keyword indicating the end event from the voice data of the first user. The keyword indicating the end event may include, for example, closing remarks (e.g., "Thank you", "See you", or "Bye").

In this disclosure, it is described that the server mainly detects the start event and the end event based on the gesture of the first user or the voice data of the first user, however, example embodiments are not limited in this respect. For example, the terminal of the first user may transmit data of a start event (or an end event) to the server based on detecting the start event (or the end event) based on the gesture of the first user or the voice data of the first user. The data of the start event may include a time at which the start event is detected from the voice data, a flag including information on the start event, and the like. The data of the end event may include a time at which the end event is detected from the voice data, a flag including information on the end event, and the like. The server may detect a start event (or an end event) based on receiving information on the start event (or the end event) from the terminal of the first user.

In operation 820, the server may extract, as the first partial voice data, a portion corresponding to a time period between the start event and the end event from the voice data of the first user. The time period between the start event and the end event may refer, for example, to a time period from a first time point in the voice data at which the start event is detected to a second time point in the voice data at which the end event is detected.

Operations 810 and 820 may correspondence to operation 610 of FIG. 6. According to an embodiment, after the first partial voice data is extracted, the server may perform an operation of determining the target user of the first partial voice data (e.g., operation 620 of FIG. 6) and an operation of instructing the target terminal to reproduce the first partial voice data (e.g., operation 630 of FIG. 6). However, examples are not limited thereto. After the start event is detected from the voice data of the first user, the server may perform an operation of detecting the target user of the first partial voice data and an operation of instructing the target terminal to reproduce the first partial voice data, and then may perform an operation of detecting the end event.

Figure 9:
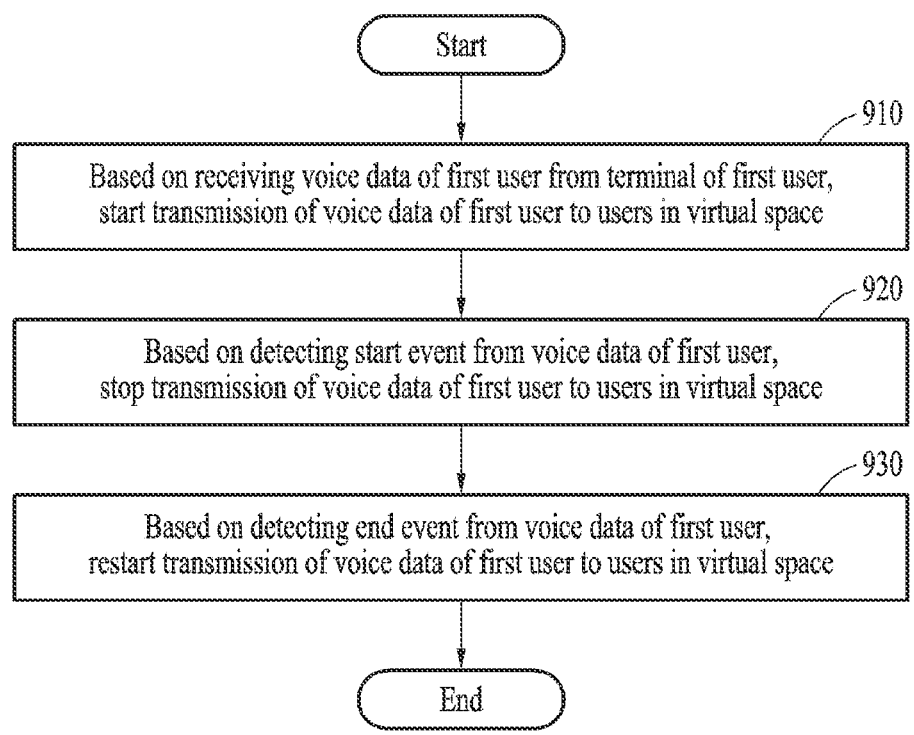
FIG. 9 is a diagram illustrating an example operation of a server transmitting voice data to users in a virtual space according to detection of a start event and an end event according to various embodiments.

FIG. 9 is a diagram illustrating an example operation of a server transmitting voice data to users in a virtual space according to detection of a start event and an end event according to various embodiments.

In operation 910, the server may start transmission of voice data to users in the virtual space, based on receiving the voice data of the first user from the terminal of the first user. For example, the server may receive the voice data of the first user from the terminal of the first user. The server may transmit the voice data to terminals of the users in the virtual space.

According to an embodiment, the server may transmit the received voice data of the first user to all the users in the virtual space, based on the start event not being detected. For example, the server may receive the voice data of the first user from the terminal of the first user. Based on the start event not being detected from the voice data of the first user, the server may transmit the voice data of the first user to all the users in the virtual space.

As described above, the start event may correspond to the start of the target utterance to be transmitted to the target user. The start event may not be detected based on the target utterance to be transmitted from the first user to the target user not being started. The server may skip the determining of a user to receive the voice data, based on the start event not being detected. The server may transmit the voice data of the first user to all the users in the virtual space, based on skipping the determining of the user to receive the voice data.

The server may instruct the terminals of the users in the virtual space to reproduce the voice data of the first user and/or to display visual information generated based on the voice data of the first user. Each of the terminals of the users in the virtual space may reproduce the voice data of the first user and/or display the visual information generated based on the voice data of the first user.

In operation 920, the server may stop the transmission of the voice data of the first user to the users in the virtual space, based on detecting the start event from the voice data of the first user.

According to an embodiment, the server may detect the start event from the voice data of the first user, based on the starting of the target utterance to be transmitted from the first user to the target user. The server may stop the transmission of voice data after the start event to the users in the virtual space. The voice data after the start event may include the first partial voice data including the target utterance. The server may stop the transmission of the voice data after the start event to the users in the virtual space, in order to transmit the first partial voice data only to the target user.

The server may restrict the transmission of the voice data of the first user recieved after the start event to the user in the virtual space. The server may instruct the terminals of the users in the virtual space so that the transmission of the voice data of the first user is restricted. For example, the terminals of the users in the virtual space may restrict the reproduction of the voice data of the first user. For example, the terminals of the users in the virtual space may restrict the display of the visual information generated based on the voice data of the first user.

In operation 930, the server may restart the transmission of the voice data of the first user to the users in the virtual space, based on detecting the end event from the voice data of the first user.

According to an embodiment, the server may detect the end event from the voice data of the first user, based on the ending of the target utterance to be transmitted from the first user to the target user. The server may restart the transmission of the voice data of the first user to the users in the virtual space, based on detecting the end event. Voice data after the end event may exclude the target utterance. In order to transmit the voice data of the first user excluding the target utterance to all the users in the virtual space, the server may restart the transmission of the voice data of the first user after the end event to the users in the virtual space.

The server may transmit the voice data of the first user after the end event to the users in the virtual space. The server may instruct the terminals of the users in the virtual space to reproduce the voice data of the first user after the end event and/or to display visual information generated based on the voice data of the first user. Each of the terminals of the users in the virtual space may reproduce the voice data of the first user after the end event and/or display the visual information generated based on the voice data of the first user after the end event.

Figure 10:
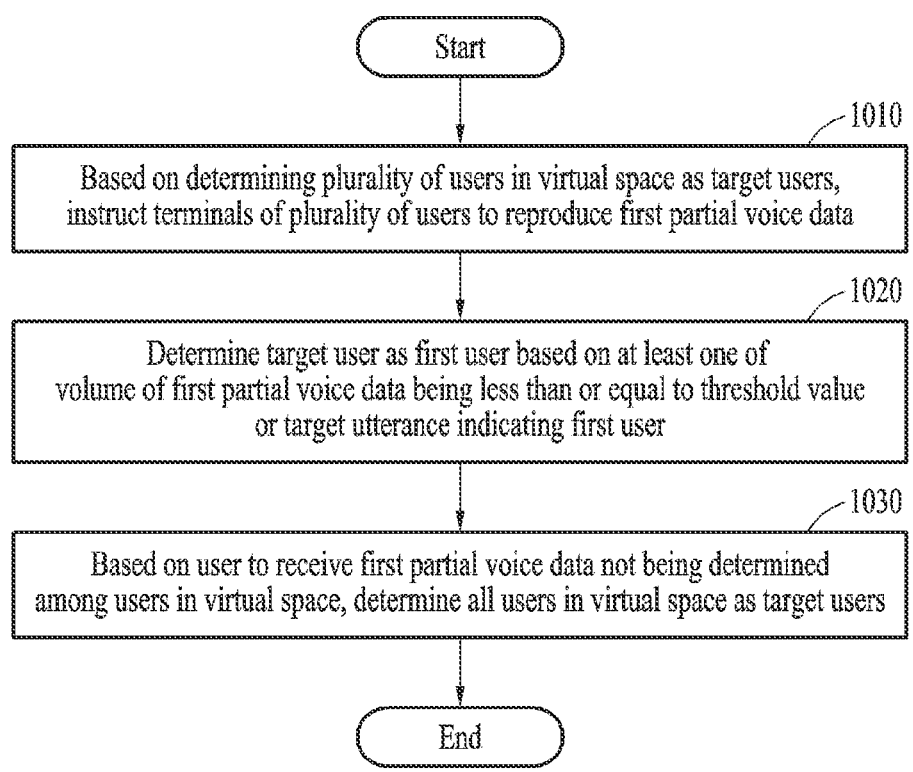
FIG. 10 is a diagram illustrating an example operation of a server determining a target user and an example operation of the server according to the determined target user according to various embodiments.

FIG. 10 is a diagram illustrating an example operation of a server determining a target user and an operation of the server according to the determined target user according to various embodiments.

According to an embodiment, the server may determine a target user to receive the first partial voice data of the first user. As described above with reference to FIG. 6, the server may determine the target user based on at least one of a gesture input of the first user or the first partial voice data.

In operation 1010, the server may instruct the terminals of a plurality of users to reproduce the first partial voice data based on determining the plurality of users in the virtual space as target users.

The server may determine a plurality of users in the virtual space as target users. The server may determine the plurality of users as the target users based on at least one of a gesture input of the first user or the first partial voice data.

The server according to an embodiment may detect a gesture for a plurality of users among the users in the virtual space. The gesture input for a plurality of users may include a gesture input of indicating or selecting one or more objects for the plurality of users.

According to an embodiment, the gesture input for a plurality of users may include a gesture input for an object related to a user group. The user group may represent a group including a plurality of users satisfying conditions related to the corresponding user group.

For example, a user group may correspond to a team (e.g., a human resources team, an accounting team, a finance team, or a sales team) of a company. For example, a user group corresponding to an accounting team may include a plurality of users belonging to the accounting team.

For example, a user group may correspond to a physical space (e.g., a building A or a C-th floor of a building B) that includes a position of a physical workspace assigned to a user. For example, a user group corresponding to a building A may include a plurality of users whose physical workplace exists in the building A.

For example, a user group may correspond to a sub-virtual space (e.g., a sub-virtual space representing a conference room D or a sub-virtual space representing a break room E) including a position of an avatar object of a user in a virtual space. For example, a user group corresponding to the sub-virtual space representing the conference room D may include a plurality of users in the sub-virtual space representing the conference room D where an avatar object of a user is positioned.

An object related to a user group may be an object in a virtual space that may be used to indicate a user group and may include a virtual object mapped to the user group. The virtual object mapped to the user group may include, for example, a virtual object indicating a team corresponding to the user group, a virtual object indicating a physical workspace corresponding to the user group, or a virtual object indicating a sub-virtual space corresponding to the user group.

A gesture input for the plurality of users may include a gesture input for a plurality of objects related to the plurality of users. When the gesture input for the plurality of objects is obtained, the server may determine users corresponding to the plurality of objects indicated by the gesture input as target users.

For example, the server may detect a first gesture for indicating or selecting an object related to a first user. The server may then detect a second gesture for indicating or selecting an object related to a second user. The second gesture for the second user may be continuously connected to the first gesture for the first user. For example, a combination of the first gesture and the second gesture may include a drag gesture. For example, the second gesture may be detected within a threshold length of time after the first gesture is detected. The server may obtain gesture inputs for the first user and the second user based on detecting the first gesture and the second gesture.

According to an embodiment, the server may detect a keyword indicating a plurality of users among the users in the virtual space from at least a portion of the first partial voice data.

For example, the server may detect a keyword indicating a plurality of users from a portion of the first partial voice data (e.g., a portion corresponding to the starting part of the first partial voice data) by analyzing the first partial voice data.

A keyword indicating a plurality of users may include a keyword indicating a user group. A keyword indicating a user group may refer, for example, to a word that may be used to indicate a corresponding user. For example, when the user group corresponds to a team, a keyword indicating the user group may include a designation of a team (e.g., a human resources team, an accounting team, a finance team, or a sales team). For example, when a user group corresponds to a physical space, a keyword indicating the user group may include a word indicating a corresponding area (e.g., a building A or a C-th floor of a building B). For example, when a user group corresponds to a sub-virtual space (e.g., a sub-virtual space representing a conference room D or a sub-virtual space representing a break room E), a keyword indicating a user group may include a word indicating a corresponding sub-virtual space (e.g., a conference room D or a break room E).

The keyword indicating a plurality of users may include keywords indicating users. For example, the server may detect a plurality of keywords (e.g., a first keyword and a second keyword) from a portion of the first partial voice data. The first keyword may be a keyword indicating the first user. The second keyword may be a keyword indicating the second user. The server may determine, as target users, the first user and the second user indicated by the detected keywords.

The server may transmit the first partial voice data to the plurality of users in the virtual space. For example, the server may instruct terminals of the plurality of users to reproduce the first partial voice data based on determining the plurality of users in the virtual space as target users. Each of the terminals of the plurality users may reproduce the first partial voice data based on receiving the instruction to reproduce the first partial voice data from the server.

In operation 1020, the server may determine the target user as the first user based on the first partial voice data. The server may extract the first partial voice data corresponding to a target utterance, which is a private speech of the first user, from the voice data of the first user. The server may determine, as the first user, a target user to receive the first partial voice data corresponding to the target utterance, which is the private speech of the first user. For example, the server may determine the target user as the first user based on at least one of the first partial voice data having a volume less than or equal to a threshold value or a target utterance indicating the first user.

According to an embodiment, the server may determine the target user as the first user based on the volume of the first partial voice data. For example, the server may determine the target user as the first user based on the first partial voice data having a volume less than or equal to the threshold value. The volume of the first partial voice data may be calculated as, for example, at least one of a minimum volume, a maximum volume, or an average volume.

A threshold value (e.g., a threshold value related to a private speech) to be compared to the volume of the first partial voice data in order to determine the first user as the target user may be independent of a threshold value (e.g., a threshold value related to the start event) to be compared to the volume of the voice data of the first user in order to detect the start event described above with reference to FIG. 6. For example, the threshold value related to the start event may be smaller than the threshold value related to the private speech. When the volume of the voice data of the first user exceeds the threshold value related to the start event, the server may detect the start event. The server may extract the first partial voice data from the voice data of the first user based on the detected start event. The server may determine the target user as the first user based on the volume of the extracted first partial voice data of the first user being less than or equal to the threshold value related to the private speech.

According to an embodiment, the server may determine the target user as the first user based on a target utterance to which the first partial voice data corresponds. For example, the server may determine the target user as the first user based on a target utterance indicating the first user. The server may identify the target utterance from the first partial voice data. The server may determine whether the target utterance indicates the first user by analyzing the target utterance.

For example, the server may search at least a portion of the target utterance from a private speech list. The server may determine that the corresponding utterance indicates the first user based on at least a portion of the target utterance being included in the private speech list. The private speech list may be a list including one or more predetermined utterances and may include one or more utterances corresponding to the private speech. For example, the private speech list may include a first utterance (e.g., "Oh"), a second utterance (e.g., "Let's do my best"), a third utterance (e.g., "I don't want to do it"), and a fourth utterance (e.g., "My goodness'). The server may determine the target user as the first user based on the target utterance indicating the first user.

The server may transmit the first partial voice data to the first user. For example, the server may instruct the terminal of the first user to reproduce the first partial voice data corresponding to the private speech of the first user. In addition, the server may restrict transmission of the first partial voice data corresponding to the private speech of the first user to a user other than the first user among the users in the virtual space. For example, the server may instruct a terminal of a user other than the first user in the virtual space to restrict the reproduction of the first partial voice data corresponding to the private speech of the first user. For example, the server may instruct the terminal of a user other than the first user in the virtual space to restrict display of visual information generated based on the first partial voice data corresponding to the private speech of the first user.

In operation 1030, the server may determine all the users in the virtual space as target users based on a user to receive the first partial voice data not being determined among the users in the virtual space. The server may not determine a user to receive the first partial voice data among the users in the virtual space. For example, when the gesture input of the first user is not obtained, the server may skip determining a target user based on the gesture input. When a keyword is not detected from the first partial voice data, the server may skip determining a target user based on the keyword. When the volume of the first partial voice data exceeds a threshold value (e.g., a threshold value related to the private speech), the server may skip determining the first user as the target user based on the volume of the first partial voice data. When an utterance identified from the first partial voice data does not indicate the first user (e.g., when an utterance identified from the first partial voice data is not included in the private speech list), the server may skip determining the first user as the target user based on the utterance identified from the first partial voice data.

The server may determine all the users in the virtual space as target users based on a user to receive the first partial voice data not being determined among the users in the virtual space. For example, when a user to receive the target utterance to be included in the first partial voice data is not determined as at least one of the users in the virtual space, the server may determine the target utterance included in the first partial voice data as an utterance to be transmitted to all the users in the virtual space.

The server may transmit the first partial voice data to all the users in the virtual space. For example, the server may instruct terminals of all the users in the virtual space to reproduce the first partial voice data based on determining all the users in the virtual space as the target users. Each of the terminals of all the users in the virtual space may reproduce the first partial voice data based on receiving the instruction to reproduce the first partial voice data from the server.

Figure 11:
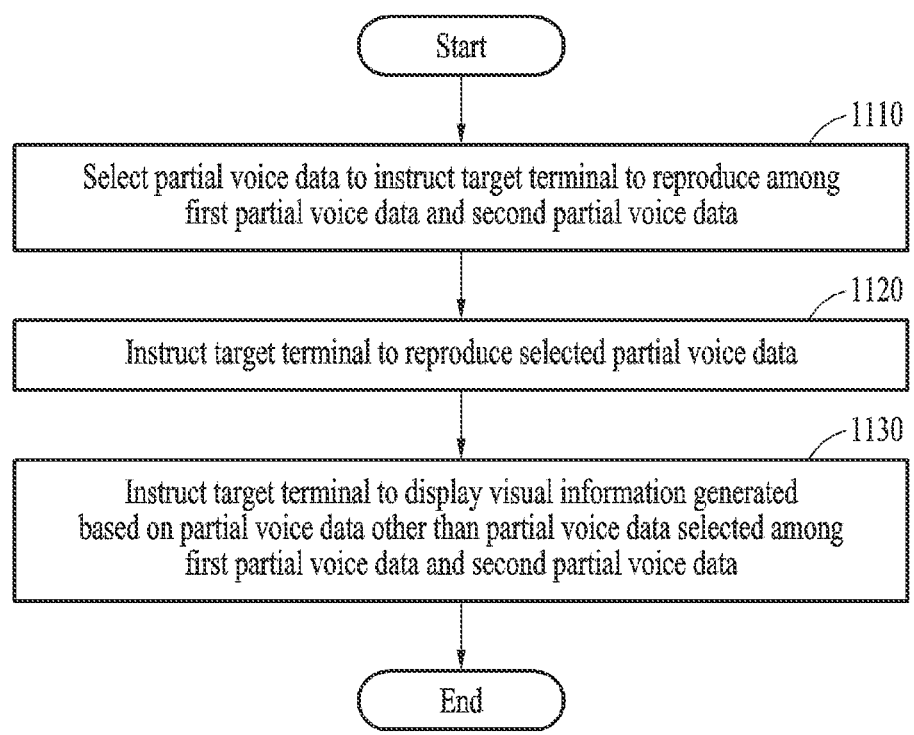
FIG. 11 is a diagram illustrating an example operation performed by a server when transmission of a plurality of pieces of partial voice data to a target user is requested according to various embodiments.

FIG. 11 is a diagram illustrating an example operation performed by a server when transmission of a plurality of pieces of partial voice data to a target user is requested according to various embodiments.

According to an embodiment, while a target terminal reproduces the first partial voice data, the transmission of second partial voice data of a second user to the target user may be requested. The server may instruct the target terminal to reproduce one piece of partial voice data of the first partial voice data and the second partial voice data. The server may restrict the reproduction of the other partial voice data of the first partial voice data and the second partial voice data. The server may instruct the target terminal to display visual information generated based on the other partial voice data.

In operation 1110, the server may select partial voice data to instruct the target terminal to reproduce among the first partial voice data and the second partial voice data.

According to an embodiment, the server may determine the partial voice data based on a priority of each of the first user and the second user. A priority of a user may be assigned to each of the users in the virtual space. For example, the priority of the user may be set based on an input of the target user. For example, the priority of the user may be determined based on characteristics of the corresponding user.

For example, when the priority of the first user is higher than or equal to the priority of the second user, the server may select the first partial voice data of the first user as the partial voice data to instruct the target terminal to reproduce. For example, when the priority of the first user is lower than or equal to the priority of the second user, the server may select the second partial voice data of the second user as the partial voice data to instruct the target terminal to reproduce.

According to an embodiment, the server may determine the partial voice data based on the number of users to receive each of the first partial voice data and the second partial voice data. The server may determine a first target user to receive the first partial voice data of the first user. The server may determine a second target user to receive the second partial voice data of the second user. Each of the first target user and the second target user may be determined as one user or a plurality of users among the users in the virtual space.

For example, the server may select, among the first partial voice data and the second partial voice data, partial voice data, that the number of users to receive is greater than or equal to that of the other partial voice data, as the partial voice data to instruct the target terminal to reproduce. For example, when the number of the first target users (e.g., five) is greater than or equal to the number of second target users (e.g., one), the server may select the first partial voice data of the first user as the partial voice data to instruct the target terminal to reproduce.

For example, the server may select, among the first partial voice data and the second partial voice data, partial voice data, that the number of users to receive is smaller than or equal to that of the other partial voice data, as the partial voice data to instruct the target terminal to reproduce. For example, when the number of the first target users (e.g., one) is smaller than or equal to the number of second target users (e.g., five), the server may select the second partial voice data of the second user as the partial voice data to instruct the target terminal to reproduce.

According to an embodiment, the server may determine the partial voice data based on a volume of the first partial voice data and a volume of the second partial voice data. The volume of the first partial voice data may include at least one of a minimum volume, a maximum volume, or an average volume of the first partial voice data.

For example, the server may select, among the first partial voice data and the second partial voice data, partial voice data having a volume higher than or equal to a volume of the other partial voice data, as the partial voice data to instruct the target terminal to reproduce. For example, when the volume of the first partial voice data is higher than or equal to the volume of the second partial voice data, the server may select the first partial voice data of the first user as the partial voice data to instruct the target terminal to reproduce.

In operation 1120, the server may instruct the target terminal to reproduce the selected partial voice data. For example, when the first partial voice data is selected as the partial voice data to instruct the target terminal, the server may instruct the target terminal to continuously reproduce the first partial voice data of the first user. For example, when the second partial voice data is selected as the partial voice data to instruct the target terminal, the server may instruct the target terminal to reproduce the second partial voice data of the second user.

In operation 1130, the server may instruct the target terminal to display visual information generated based on partial voice data other than the partial voice data selected among the first partial voice data and the second partial voice data. The server may instruct the target terminal to restrict the reproduction of the other partial voice data.

For example, when the first partial voice data is selected as the partial voice data to instruct the target terminal, the server may instruct the target terminal to display visual information generated based on the second partial voice data of the second user. The server may instruct the target terminal to restrict the reproduction of the second partial voice data of the second user.

For example, when the second partial voice data is selected as the partial voice data to instruct the target terminal, the server may instruct the target terminal to display visual information generated based on the first partial voice data of the first user. The server may instruct the target terminal to stop the reproduction of the first partial voice data of the first user.

Figure 12:
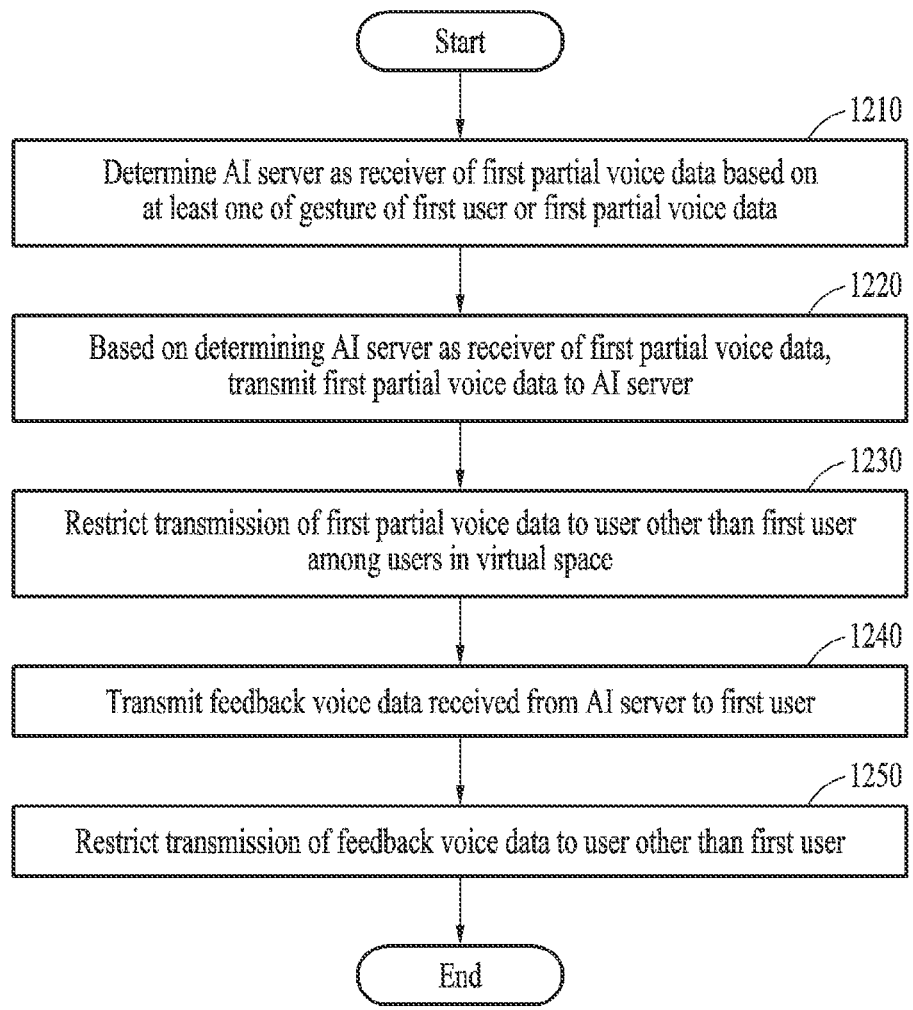
FIG. 12 is a diagram illustrating an example operation of a server transmitting partial voice data to an artificial intel-

FIG. 12 is a diagram illustrating an example operation of a server transmitting partial voice data to an AI server and receiving feedback voice data from the AI server according to various embodiments.

In operation 1210, the server may determine an AI server as a receiver of the first partial voice data based on at least one of a gesture input of the first user or the first partial voice data.

For example, the terminal of the first user may execute a voice assistant application (or an AI assistant application) based on the AI server being determined as the receiver of the first partial voice data of the first user. The terminal of the first user may transmit the first partial voice data to the AI server through the voice assistant application. For example, the terminal of the first user may transmit the first partial voice data to the AI server. For example, the terminal of the first user may transmit the first partial voice data to a server constructing a virtual space, and the server constructing the virtual space may transmit the first partial voice data to the AI server.

The AI server (e.g., a second server) may include a server other than the server (e.g., a first server) constructing the virtual space. The AI server may analyze partial voice data having an utterance of a user and generate feedback voice data for the partial voice data.

According to an embodiment, the AI server may include at least one of an automatic speech recognition (ASR) module, a natural language understanding (NLU) module, a natural language generator (NLG) module, or a text-to-speech (TTS) module. The ASR module may convert voice data of a user received from a terminal of the user into text data. The NLU module may discern an intent of a user using the text data converted from the voice data. For example, the NLU module may discern an intent of a user by performing syntactic analysis or semantic analysis. For example, the NLU module may discern the meaning of a word detected from the voice data using a linguistic feature (e.g., a grammatical element) of a morpheme or phrase, and determine an intent of a user by matching the discerned meaning of the word to an intent. The NLG module may change designated information into text data in the form of a natural language utterance. The TTS module may convert text data into information in audio form.

According to an embodiment, the server may determine the AI server as the receiver of the first partial voice data based on a gesture input of the first user. The server may determine the AI server as the receiver of the first partial voice data based on obtaining the gesture input for the AI server.

The gesture input for the AI server may include a gesture input of indicating or selecting an object related to the corresponding AI server. An object related to the AI server may refer, for example, to an object in the virtual space that may be used to indicate the AI server. For example, the object related to the AI server may include a virtual object indicating the AI server.

The gesture input for the AI server may include a gesture input of indicating or selecting an input and output interface of the AI server. The input and output interface of the AI server may include an interface configured to reproduce and/or display, to a user, input data of the AI server transmitted from the user to the AI server. The input and output interface of the AI server may include an interface configured to reproduce and/or display, to a user, output data of the AI server transmitted from the AI server to the user.

According to an embodiment, the server may determine the AI server as the receiver of the first partial voice data based on the first partial voice data.

For example, the server may detect a keyword indicating the AI server from at least a portion of the first partial voice data. A keyword indicating the AI server may include a word that may be used to indicate the AI server. For example, a keyword indicating the AI server may include a title of the AI server. For example, a keyword indicating the AI server may include a word preset by a user (e.g., a wakeup keyword).

For example, the server may determine that the target utterance of the first partial voice data corresponds to an instruction for the AI server. For example, the target utterance of the first partial voice data may correspond to an instruction for an operation that may be performed by the AI server. The operation that may be performed by the AI server may include an operation that may be performed by the server, for example, an operation of transmitting a weather forecast or an operation of converting a unit.

For example, the server may determine the AI server as the receiver of the first partial voice data based on a volume of the first partial voice data. For example, the server may determine the AI server as the receiver of the first partial voice data based on a volume of the first partial voice data being less than or equal to a threshold value.

A threshold value (e.g., a threshold value related to the AI server) to be compared to the volume of the first partial voice data in order to determine the AI server as the receiver of the first partial voice data may be independent of a threshold value (e.g., a threshold value related to the start of the target utterance) to be compared to the volume of the voice data of the first user in order to detect the start event described above with reference to FIG. 6, and a threshold value (e.g., a threshold value related to the private speech) to be compared to the volume of the first partial voice data in order to determine the first user as the target user described above with reference to FIG. 10.

For example, the threshold value related to the start event may be less than the threshold value related to the private speech, and the threshold value related to the private speech may be less than the threshold value related to the AI server. When the volume of the voice data of the first user exceeds the threshold value related to the start event, the server may detect the start event. The server may extract the first partial voice data from the voice data of the first user based on the detected start event. The server may skip determining the target user as the first user based on the volume of the extracted first partial voice data of the first user exceeding the threshold value related to the private speech. The server may determine the AI server as the receiver of the first partial voice data based on the volume of the extracted first partial voice data of the first user exceeding the threshold value related to the private speech and being less than or equal to the threshold value related to the AI server.

In operation 1220, the server may transmit the first partial voice data to the AI server based on determining the AI server as the receiver of the first partial voice data. For example, the server may instruct the second server to generate feedback voice data for the first partial voice data. The first server may instruct the second server to transmit the generated feedback voice data to the first server.

Although not shown in FIG. 12, the first server may transmit the first partial voice data to the second server. The second server may receive the first partial voice data from the first server. The second server may generate the feedback voice data for the first partial voice data by analyzing the first partial voice data. For example, the first partial voice data may have a target utterance having a question (e.g., how many centimeters is 23 inches?). The second server may generate the feedback voice data having a response utterance (e.g., 23 inches is 58.42 centimeters) to the target utterance. The second server may transmit the feedback voice data to the first server. As will be described below, based on receiving the feedback voice data from the second server, the first server may transmit the received feedback voice data to the target user.

In operation 1230, the first server may restrict the transmission of the first partial voice data to a user other than the first user among the users in the virtual space.

According to an embodiment, the first server may restrict the transmission of the first partial voice data to a user other than the first user. For example, the first server may instruct a terminal of the other user to restrict the reproduction of the first partial voice data. For example, the first server may instruct the terminal of the other user to restrict display of visual information generated based on the first partial voice data.

According to an embodiment, the first server may restrict the transmission of the first partial voice data to the user other than the first user independently of a distance between an avatar object of the first user and an avatar object of the other user in the virtual space. For example, even if the avatar object of the first user is positioned closer to an avatar object of the other user (e.g., a distance less than or equal to a threshold distance) in the virtual space, the first server may restrict the transmission of the first partial voice data to the user other than the first user.

In operation 1240, the server may transmit the feedback voice data received from the AI server to the first user.

The first server may receive the feedback voice data from the second server. The first server may transmit the received feedback voice data to the first user based on the received feedback voice data being the first partial voice data of the first user. For example, the first server may instruct the terminal of the first user to reproduce the feedback voice data and/or display visual information generated based on the feedback voice data.

According to an embodiment, the first server may instruct the reproduction of the feedback voice data to the terminal of the first user. Based on the transmission of the feedback voice data to the first user being requested while the terminal of the first user reproduces other voice data, the first server may instruct the terminal of the first user to display visual information generated based on the feedback voice data. Based on the transmission of the feedback voice data to the first user being requested while the terminal of the first user reproduces other voice data, the first server may instruct the terminal of the first user to restrict the reproduction of the feedback voice data.

According to an embodiment, the first server may instruct the terminal of the first user to reproduce the feedback voice data. Based on the transmission of the feedback voice data to the first user being requested while the terminal of the first user reproduces other voice data, the first server may instruct the terminal of the first user to reproduce voice data obtained by mixing the other voice data and the feedback voice data. The mixed voice data may be generated by mixing the other voice data and the feedback voice data at a predetermined ratio.

In operation 1250, the server may restrict the transmission of the feedback voice data to a user other than the first user.

According to an embodiment, the first server may restrict the transmission of the feedback voice data to a user other than the first user. For example, the first server may instruct a terminal of the other user to restrict the reproduction of the feedback voice data. For example, the first server may instruct the terminal of the other user to restrict the display of visual information generated based on the feedback voice data.

According to an embodiment, the first server may restrict the transmission of the feedback voice data to a user other than the first user independently of a distance between an avatar object of the first user and an avatar object of the other user in the virtual space. For example, even if the avatar object of the first user is positioned closer to an avatar object of the other user (e.g., a distance less than or equal to a threshold distance) in the virtual space, the first server may restrict the transmission of the feedback voice data to the user other than the first user.

The server according to an embodiment may restrict an interaction between the user and the AI server from being provided to other users. The server may restrict the transmission of voice data (e.g., the first partial voice data) transmitted from the user to the AI server to other users. The server may restrict the transmission of voice data (e.g., the feedback voice data) transmitted from the AI server to the user to other users. The server may provide users with a metaverse space where the users may freely interact with an AI server without being exposed to other users.

The electronic device according to embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic device is not limited to those described above.

It should be appreciated that embodiments of the disclosure and the terms used therein are not intended to limit the technological features set forth herein to particular embodiments and are intended to include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," may include any one of the items listed together in the corresponding one of the phrases, or all possible combinations thereof. Terms such as "1'," and "T d," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., by wire), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function or operation according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between data being semi-permanently stored in the storage medium and data being temporarily stored in the storage medium.

According to an embodiment, a method according to various embodiments disclosed herein may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A server for constructing a virtual space, the server comprising:
    memory configured to store computer-executable instructions; and
    at least one processor,
    wherein the instructions, when executed, configure the at least one processor individually or collectively to control the server to at least:
        extract first partial voice data corresponding to a target utterance from voice data of a first user received from a terminal of the first user among users in the virtual space;
        determine a target user to receive the first partial voice data of the first user;
        instruct a target terminal of the target user to reproduce the first partial voice data;
        based on transmission to the target user of second partial voice data corresponding to an utterance from voice data of a second user being requested while the target terminal reproduces the first partial voice data, select partial voice data to instruct the target terminal to reproduce from among the first partial voice data and the second partial voice data;
        instruct the target terminal to reproduce the selected partial voice data; and
        instruct the target terminal to display visual information generated based on the non-selected one from among the first partial voice data and the second partial voice data.

2. A method performed by a server for constructing a virtual space, the method comprising:
    extracting first partial voice data corresponding to a target utterance from voice data of a first user received from a terminal of the first user among users in the virtual space;
    determining a target user to receive the first partial voice data of the first user;
    instructing a target terminal of the target user to reproduce the first partial voice data; and
    based on transmission to the target user of second partial voice data corresponding to an utterance from voice data of a second user being requested while the target terminal reproduces the first partial voice data, instructing the target terminal to reproduce the first partial voice data, but not the second partial voice data, and to display visual information including text converted from the utterance of the second user.

3. The method of claim 2, wherein the extracting of the first partial voice data comprises:
    detecting a start event and an end event from the voice data of the first user based on at least one of a gesture input of the first user or a portion of the voice data of the first user; and
    extracting from the voice data of the first user, as the first partial voice data, a portion corresponding to a time period between the start event and the end event.

4. The method of claim 2, further comprising:
    based on receiving the voice data of the first user from the terminal of the first user, starting transmission of the voice data of the first user to the users in the virtual space;
    based on detecting a start event from the voice data of the first user, stopping the transmission of the voice data of the first user to the users in the virtual space; and
    based on detecting an end event from the voice data of the first user, restarting the transmission of the voice data of the first user to the users in the virtual space.

5. The method of claim 2, wherein the instructing of the target terminal of the target user to reproduce the first partial voice data comprises:
    restricting transmission of the first partial voice data to a user among the users in the virtual space other than the determined target user.

6. The method of claim 2, wherein the instructing of the target terminal to display the visual information generated based on the second partial voice data comprises:
    instructing the target terminal to restrict reproduction of the second partial voice data.

7. The method of claim 2, further comprising:
    selecting partial voice data to instruct the target terminal to reproduce from among the first partial voice data and the second partial voice data;
    instructing the target terminal to reproduce the selected partial voice data; and
    instructing the target terminal to display visual information generated based on partial voice data other than the selected partial voice data among the first partial voice data and the second partial voice data.

8. The method of claim 2, further comprising:
    determining an artificial intelligence (AI) server other than the server as a receiver of the first partial voice data based on at least one of a gesture input of the first user or the first partial voice data;

based on the determining of the AI server as the receiver of the first partial voice data, transmitting the first partial voice data to the AI server; and restricting transmission of the first partial voice data to a user other than the first user among the users in the virtual space.

9. The method of claim 8, further comprising:

transmitting feedback voice data received from the AI server to the first user; and restricting the transmission of the feedback voice data to a user other than the first user.

10. The method of claim 2, wherein the determining of the target user comprises:

based on not determining a user among the users in the virtual space to receive the first partial voice data, determining all users in the virtual space as target users.

11. A server for constructing a virtual space, the server comprising:

memory configured to store computer-executable instructions; and at least one processor, wherein the instructions, when executed, configure the at least one processor individually or collectively to control the server to at least:

extract first partial voice data corresponding to a target utterance from voice data of a first user received from a terminal of the first user among users in the virtual space;

determine a target user to receive the first partial voice data of the first user;

instruct a target terminal of the target user to reproduce the first partial voice data; and based on transmission to the target user of second partial voice data corresponding to an utterance from voice data of a second user being requested while the target terminal reproduces the first partial voice data, instruct the target terminal to reproduce the first partial voice data, but not the second partial voice data, and to display visual information including text converted from the utterance of the second user.

12. The server of claim 11, wherein the instructions, when executed, configure the at least one processor to individually or collectively control the server to:

detect a start event and an end event from the voice data of the first user based on at least one of a gesture input of the first user or a portion of the voice data of the first user; and extract from the voice data of the first user, as the first partial voice data, a portion corresponding to a time period between the start event and the end event.

13. The server of claim 11, wherein the instructions, when executed, configure the at least one processor to individually or collectively control the server to:

based on receiving of the voice data of the first user from the terminal of the first user, start transmission of the voice data of the first user to the users in the virtual space;

based on detecting of a start event from the voice data of the first user, stop the transmission of the voice data of the first user to the users in the virtual space; and based on detecting of an end event from the voice data of the first user, restart the transmission of the voice data of the first user to the users in the virtual space.

14. The server of claim 11, wherein the instructions, when executed, configure the at least one processor to individually or collectively control the server to:

restrict transmission of the first partial voice data to a user among the users in the virtual space other than the determined target user.

15. The server of claim 11, wherein the instructions, when executed, configure the at least one processor to individually or collectively control the server to:

instruct the target terminal to restrict reproduction of the second partial voice data.

16. The server of claim 11, wherein the instructions, when executed, configure the at least one processor to individually or collectively control the server to:

based on determining a plurality of users in the virtual space as target users, instruct terminals of the plurality of users to reproduce the first partial voice data.

17. The server of claim 11, wherein the instructions, when executed, configure the at least one processor to individually or collectively control the server to:

determine an artificial intelligence (AI) server other than the server as a receiver of the first partial voice data based on at least one of a gesture input of the first user or the first partial voice data;

based on the determining of the AI server as the receiver of the first partial voice data, transmit the first partial voice data to the AI server; and restrict transmission of the first partial voice data to a user other than the first user.

18. The server of claim 17, wherein the instructions, when executed, configure the at least one processor to individually or collectively control the server to:

transmit feedback voice data received from the AI server to the first user; and restrict the transmission of the feedback voice data to a user other than the first user.

19. The server of claim 11, wherein the instructions, when executed, configure the at least one processor to individually or collectively control the server to:

determine the target user as the first user based on at least one of a volume of the first partial voice data being less than or equal to a threshold value or at least a portion of the target utterance indicating the first user.

20. The server of claim 11, wherein the instructions, when executed, configure the at least one processor to individually or collectively control the server to:

based on not determining a user among the users in the virtual space as a user to receive the first partial voice data, determine all users in the virtual space as target users.

* * * * *